(12) United States Patent
Bhat et al.

(10) Patent No.: US 11,487,442 B1
(45) Date of Patent: Nov. 1, 2022

(54) DATA STORAGE INTERFACE FOR PROTOCOL-AGNOSTIC STORAGE SERVICES

(71) Applicant: Amazon Technologies, Inc., Seattle, WA (US)

(72) Inventors: Sachin Suresh Bhat, Sunnyvale, CA (US); Lionel Bitoun, Palo Alto, CA (US); LiJing Chen, Sunnyvale, CA (US); Jaikit Dungarshi Savla, Sunnyvale, CA (US); Daniel Wu, Sunnyvale, CA (US); Jaden Wright, Pasadena, CA (US); Adam Tessier, Bethesda, MD (US); Sourabh Shrivastav, Sunnyvale, CA (US); Rutvik Gopalkrishna Hora, Union City, CA (US); Manjunath Tumkur Maheshchandra, Santa Clara, CA (US); Ramanathan Padinjarel Somanathan, Fremont, CA (US); Manoj Kumar Dhanger, San Jose, CA (US); Nitin Saini, San Jose, CA (US); Jeet Nishit Mehta, Sunnyvale, CA (US); Ruonan Zhang, Mountain View, CA (US); Harshaneel Harshal Gokhale, Santa Clara, CA (US); Ravneet Singh Sidhu, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/305,144

(22) Filed: Jun. 30, 2021

(51) Int. Cl.
*G06F 3/00* (2006.01)
*G06F 3/06* (2006.01)
*H04L 9/08* (2006.01)

(52) U.S. Cl.
CPC ............ *G06F 3/0622* (2013.01); *G06F 3/061* (2013.01); *G06F 3/067* (2013.01); *G06F 3/0664* (2013.01); *H04L 9/088* (2013.01)

(58) Field of Classification Search
None
See application file for complete search history.

(56) References Cited

U.S. PATENT DOCUMENTS 11,336,532 B1 * 5/2022 Ellsworth ............... H04L 41/22

* cited by examiner

*Primary Examiner* — Midys Rojas
(74) *Attorney, Agent, or Firm* — Knobbe, Martens, Olson & Bear, LLP

(57) ABSTRACT

A data storage interface provides access to data storage clusters that may not otherwise be accessible to data accessors. The data storage interface can serve as a point of access for data accessors to access stored data via a consistent data access protocol, even when a data storage cluster on which requested data is stored may use a different protocol. The data storage interface can also provide access across network boundaries, such as those between different private cloud computing systems (e.g., virtual private clouds or "VPCs").

20 Claims, 12 Drawing Sheets

DATA STORAGE INTERFACE FOR PROTOCOL-AGNOSTIC STORAGE SERVICES

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

Data centers may provide data storage services configured to store data submitted by client devices, and enable retrieval of that data over a network. A variety of types of data storage services can be provided, often varying according to their input/output (I/O) mechanisms. For example, database services may allow I/O based on a database query language, such as the Structured Query Language (SQL). Block storage services may allow I/O based on modification to one or more defined-length blocks, in a manner similar to how an operating system interacts with local storage, and may thus facilitate virtualized disk drives usable, for example, to store an operating system of a virtual machine. Object storage services may allow I/O at the level of individual objects or resources, such as individual files, which may vary in content and length. Some storage services provide caching services. A cache is a high-speed data store which stores a subset of data, typically transient in nature, so that future requests for that data are served up faster than is possible by accessing the data's primary storage location.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
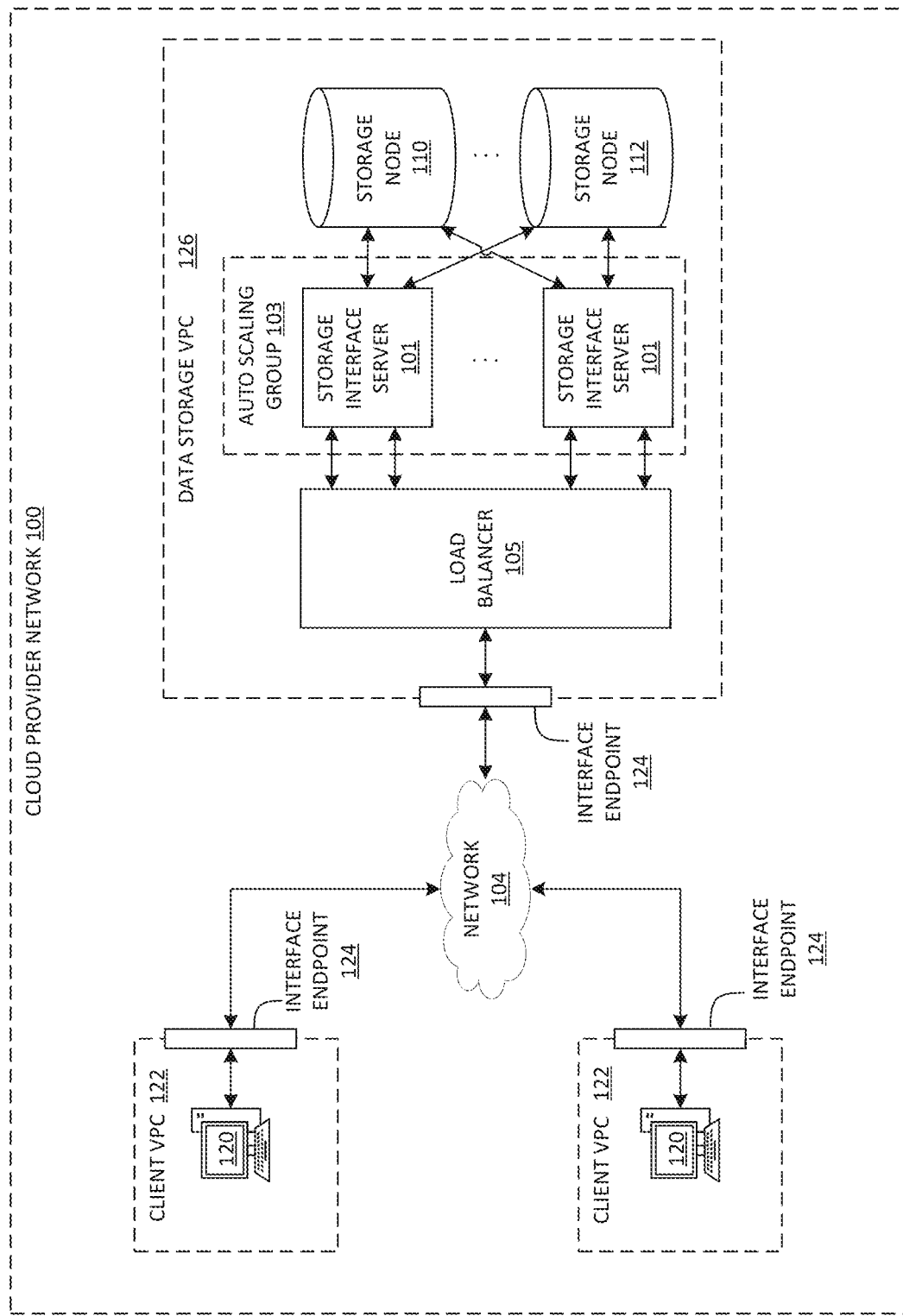
FIG. 1 is a block diagram depicting an illustrative environment in which a storage interface server can operate to provide cross-VPC access to a plurality of data storage nodes according to some embodiments.

Generally described, the present disclosure relates to a data storage interface that provides access to data storage nodes and systems that may not otherwise be accessible to data accessors. The data storage interface can serve as a point of access for data accessors to access stored data via a consistent data access protocol, even when a data storage system in which requested data is stored may use a different protocol. The data storage interface can also provide access across network boundaries, such as those between different private cloud computing systems (e.g., virtual private clouds or "VPCs").

Some data storage systems require data accessors to have knowledge of various configuration aspects of data storage nodes and/or clusters, such as the manner in which data is assigned to particular clusters for storage, the network address or other location information for the physical and/or virtual machines on which the data can be accessed, etc. In addition, some storage systems require use of particular data access protocols to access the stored data. Without this knowledge and/or use of the proper protocol, data accessors may not be able to access the data. For example, if data is stored in data clusters that are in a secure network that is separate from that of the data accessors, the data clusters may be effectively undiscoverable by data accessors, or the data accessors may otherwise be blocked from communicating with the data clusters. In addition, development and maintenance activities may be affected when changes to the configuration of a data storage system interfere with data access and require corresponding changes to the data accessor systems. For example, changes to the manner in which data is stored, the protocol that is to be used, etc. may require corresponding changes to be made to the data accessors.

Some aspects of the present disclosure address the issues above, among others, by providing a data storage interface that serves as a point of access for data accessors to access stored data. The data storage interface may be implemented as layer between data accessors and backend storage systems. By virtue of its position between data accessors and data storage systems, the data storage interface can perform a variety of operational features to solve various data access issues.

In some embodiments, the data storage interface provides a consistent, unified application programming interface ("API") and data access protocol for data accessors to access data in one or more backend storage systems. The API and protocol may be the same as, or different from, those of the backend storage systems. For example, a backend data storage system may be a cache system configured as an in-memory store of data from database calls, web page renderings, etc., and may use a particular protocol for data access operations, such as Memcached Transmission Control Protocol ("TCP") or Memcached User Datagram Protocol ("UDP"). A second backend storage system may be a cache system that uses a different protocol, such as the Redis protocol. The data storage interface can provide access to both storage systems using a single protocol, which may be one of the protocols used by a backend storage system or a different protocol altogether. When the data storage interface receives a request for data stored in a backend data storage system, the data storage interface determines the protocol to be used to access data in the backend storage system and, if needed, translates or otherwise processes the request for use with a different protocol than that by which the request was received.

In some embodiments, the data storage interface is implemented in a virtual private cloud with the backed data storage system(s). The data storage interface may be configured to provide data accessors in different VPCs with access to data stored in the backend data storage system(s) that the data storage interface fronts. In this configuration, the data storage interface may provide the cross-network/cross-cloud interface to the backend data storage system by maintaining a mapping of data item identifiers (e.g., keys) to storage configuration information, such as the storage cluster/node locations at which the data corresponding to the data item identifiers are stored. Thus, the data accessors do not need to maintain or have knowledge of the storage cluster/node locations; all that is required is the proper identifier for the requested data. Moreover, stored data may be moved among clusters/nodes, or even moved to different backend data storage systems that may or may not use different data access protocols. The data storage interface can shield data accessors from such changes and ensure that the data remains accessible using the same protocol and methods throughout the life of the stored data.

Additional aspects of the present disclosure relate to additional processing performed by the data storage interface. By virtue of the data storage interface's position between data accessors and backend data storage systems, the data storage interface can perform various processing operations without necessarily requiring any instruction from a data accessor or backend data storage system to do so. For example, the data storage interface can apply modifications such as filters, obfuscation, or the like to data obtained from the backend storage system prior to providing the data to a data accessor. As another example, the data storage interface can merge two or more data items, or portions thereof, prior to providing the merged data to the data accessor, even if the data accessor does not specifically request the two or more data items. In some embodiments, the data storage interface can perform analytics and traffic management. For example, the data storage interface can detect and mitigate the effect of high request volumes for individual data items (e.g., data items with "hot keys"), throttle access to particular storage clusters and/or nodes, process data to be returned to data accessors, and the like.

Further aspects of the present disclosure relate to managing multiple threads for providing the features of the data storage interface in a responsive and robust manner. In some embodiments, the data storage interface may use a thread to handle multiple non-blocking operations, such as request decoding and encoding. A pool of threads may be used to handle blocking operations, such as requesting data from a data storage system and performing any additional processing. By providing a pool of threads to handle such blocking operations resulting from non-blocking request decoding operations of a different thread, a high degree of efficiency and responsiveness can be maintained.

Various aspects of the disclosure will now be described with regard to certain examples and embodiments, which are intended to illustrate but not limit the disclosure. Although aspects of some embodiments described in the disclosure will focus, for the purpose of illustration, on particular examples of network configurations, data storage architectures, data access protocols, and data analytics and processing operations, the examples are illustrative only and are not intended to be limiting. In some embodiments, the techniques described herein may be applied to additional or alternative network configurations, data storage architectures, data access protocols, data analytics and processing operations, and the like.

Overview of Example Computing Environment

With reference to an illustrative embodiment, FIG. 1 shows an example computing environment in which features of the present disclosure may be implemented. As shown, the computing environment includes a cloud provider network 100 (also referred to herein as a "cloud provider network," "provider network," "cloud provider system", or simply as a "cloud" for convenience).100

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers (which provide compute instances via the usage of one or both of CPUs and GPUs, optionally with local storage) and block store servers (which provide virtualized persistent block storage for designated compute instances). These virtual computing devices have attributes of a personal computing device including hardware (various types of processors, local memory, random access memory ("RAM"), hard-disk and/or solid-state drive ("SSD") storage, a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

A cloud provider network 100 can be formed as a number of regions, where a region is a separate geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network). Transit Centers ("TCs") are the primary backbone locations linking customers to the cloud provider network, and may be co-located at other network provider facilities (e.g., Internet service providers, telecommunications providers). Each region can operate two TCs for redundancy.

By way of illustration, data accessor servers 120 (also referred to simply as "data accessors") are shown as hosted within separate virtual private clouds ("VPCs") 122. In some embodiments, a VPC represents an isolated pool of computing resources within a cloud provider network 100. In some embodiments, different VPCs may be associated with different accounts of the cloud provider network 100, providing additional separation and distinction between VPCs. Cross-VPC communication may be restricted to interface endpoints 124, inhibiting direct communication between the client VPCs 122. Thus, in a conventional configuration, data sources in one VPC, such as storage nodes 110 and 112, may be inaccessible to servers in another VPC, such as data accessor servers 120. In some embodiments, this may be accomplished through allocation of a private IP subnet for each VPC and a virtual local area network ("VLAN") or encrypted virtual communication construct. With respect to the present disclosure, interface endpoints 124 may provide routing from computing resources within the VPC 122 to external endpoints across a network 104.

Data accessor servers 120 may be hosted client services within the cloud provider network 100. The data accessor servers 120 may be individual service hosts, or they may include multiple service hosts. Additionally, the data accessor servers 120 may host a plurality of services that communicate over network 104 via interface endpoint 124. In some embodiments, these services may provide public-facing APIs that can be accessed by users or other services via the network 104.

FIG. 1 further shows storage interface servers 101 in connection with a load balancer 105 and storage nodes 110 and 112. By way of illustration, the storage interface servers 101, load balancer 105, and storage nodes 110 and 112 are shown as hosted within a data storage VPC 126 that is separate from the client VPCs 122. As described above, cross-VPC communication, including communication between the data storage VPC 126 and client VPCs 122, may be restricted to interface endpoints 124.

In some embodiments, a storage interface server 101 may be a virtual server. Illustratively, the storage interface servers 101 are shown within auto scaling group 103. In some embodiments, the number of storage interface servers may increase or decrease as the servers are instantiated to accommodate increasing or decreasing request traffic from data accessor servers 120. To reduce the load on any individual storage interface server 101, load balancer 105 may split traffic from interface endpoint 124 among the storage interface servers 101.

In FIG. 1, storage nodes 110 and 112 are addressable storage endpoints. In some embodiments, these storage units may be individual storage servers hosting cache and/or database services such as memcached, SQL, etc. Additionally or alternatively, the storage nodes may comprise clusters of storage servers, where a cluster comprises a plurality of individual servers that are collectively addressable as a single endpoint. Notably, storage nodes 110 and 112 may comprise different storage technologies. In some embodiments, the different storage technologies are capable of handling data access requests via messages utilizing different data access protocols.

Thus, in some embodiments transmitting a data access request to storage node 110 may require utilizing a different protocol than transmitting a data access request to storage node 112.

In some embodiments, a storage interface server 101 is configured to communicate over network 104 to client data accessor servers 120 using a standardized protocol, such as Redis, Jedis, etc. The data accessor servers 120 may use the standardized protocol to send data access requests comprising requests for data stored on storage nodes 110 and/or 112. In these embodiments, a storage interface server 101 serves, in part, as a proxy to translate data access requests from the standardized protocol to one or more protocols associated with the storage technologies of storage nodes 110 and/or 112, as described in greater detail below.

Although FIG. 1 shows two client VPCs 122 and a single data storage VPC 126 with two storage interface servers 101 and two storage nodes 110 and 112 within the data storage VPC 126, the example shown is illustrative only and is not intended to be limiting, required, or exhaustive. In some embodiments the data storage VPC 126 may include any number of storage interface servers and/or storage nodes. In some embodiments, there may be more than one data storage VPC 126, and/or additional or fewer client VPCs.

Example Request-Response Interaction

Figure 2:
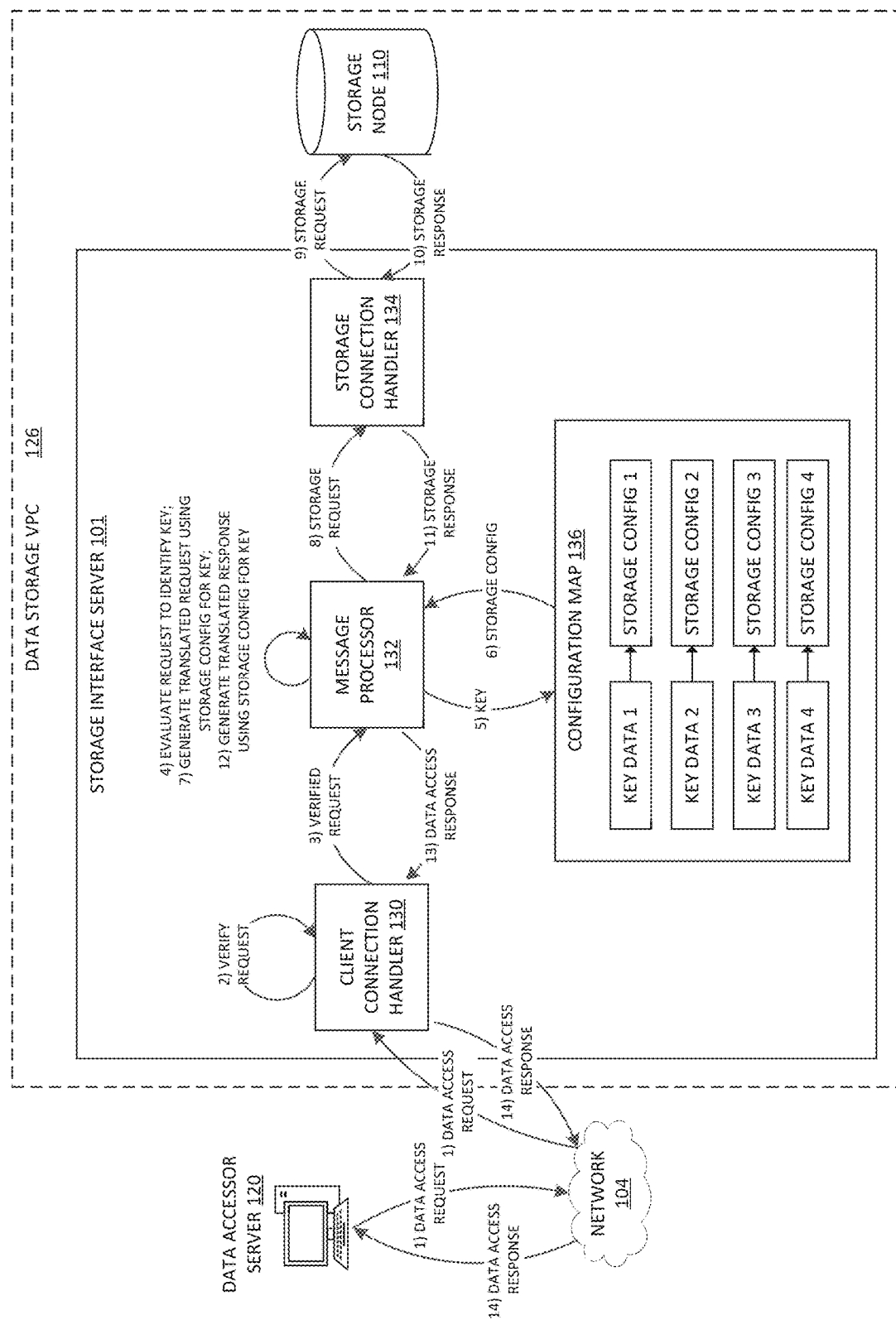
FIG. 2 is a block diagram of illustrative data flows and interactions between components of an example storage interface server and an external data accessor server implemented according to some embodiments.

FIG. 2 shows an example storage interface server 101 having a client connection handler 130, a message processor 132, a storage connection handler 134, and a configuration map 136. The components of the storage interface server 101 may be implemented on separate computing devices. For example, the client connection handler 130, message processor 132 and storage connection handler 134 may each be implemented using different subsets of computing hardware available to the data storage VPC 126. In some embodiments, various combinations of components may be implemented on the same computing device or subset of computing hardware. For example, the client connection handler, message processor, and/or storage connection handler 134 may each reside or otherwise be implemented using a single server computing device.

Client connection handler 130 may maintain network connections with data accessor servers 120. In some embodiments, client connection handler 130 may establish a transient connection on receipt of a data access request from a data accessor 120, and close the connection once it is completed. Alternatively or in addition, the client connection handler 130 may maintain a connection to a data accessor 120 until a timeout occurs or the data accessor 120 terminates the connection. In some embodiments, the client connection handler 130 may further perform authentication of data accessors 120 before accepting data access requests.

Storage connection handler 134 may maintain network connections to storage nodes, such as storage node 110 as shown. In some embodiments, storage connection handler 134 may establish transient a connection with a storage node for the purpose of sending a request and receiving a response. Alternatively or in addition, the storage connection handler 134 may maintain active connections to storage nodes across transactions. In some embodiments, the storage connection handler 134 may further authenticate to the storage nodes to initiate connections and/or perform transactions.

Message processor 132 may translate requests received from data accessor 120 into requests to be sent to backend storage nodes, process data received from storage nodes, and/or perform other processing operations in response to requests. The message processor 132 may use a configuration map 136 to perform such request translation and other request processing.

Configuration map 136 may be a map of certain request-based information to storage-based configuration used by the message processor 132 to process requests. For example, the configuration map may be a map of data object keys to storage node configurations for the nodes on which the data objects are stored. As described in more detail below, in some embodiments the configuration map may be resident in local memory of the storage interface server 101. Additionally or alternatively, in some embodiments the configuration map may comprise an external service or non-local storage.

FIG. 2 depicts illustrative interactions for servicing of a data access request, including cross-VPC communication and request translation. The interactions begin at (1), where a data accessor server 120 sends a data access request to a storage interface server 101. The request may be a request for a data object stored within or otherwise accessible via the data storage VPC 126. The request may include or otherwise be associated with information identifying the source of if the request (e.g., an identifier of the data accessor 120 and/or an account under which the data accessor 120 is making the request), information identifying the data object being requested (e.g., a key of the data object), information identifying the action being requested (e.g., a GET request), other information, or some combination thereof. The request may be formatted and sent in accordance with a particular data access protocol that the storage interface server 101 is configured to understand. Advantageously, the same data access protocol may be used to request data from the storage interface server 101 regardless of which data access protocol is to be used to actually retrieve the requested data from a storage node.

At (2), the request is received and verified by a client connection handler 130 of the storage interface server 101. In some embodiments, verification of the request may comprise verifying, by the client connection handler 130, that the request conforms to a communications protocol associated with the storage interface server 101. For example, a storage interface server may communicate with data accessors using the Redis protocol, and the client connection handler 120 may verify that a received request conforms to the Redis protocol rather than some other protocol (e.g., the Jedis protocol) before performing any further processing of the request. In some embodiments, the request verification may include an authentication step, wherein the client connection handler 130 may confirm that the data accessor server 120 has the appropriate credentials to make a request to the storage interface server 101.

At (3), the client connection handler 130 forwards the verified request to message processor 132. In some embodiments, forwarding the request may comprise enqueuing the request on a request queue associated with the message processor 132. In these embodiments, the message processor 132 may process requests sequentially in the order they are received. Alternatively or additionally, the message processor 132 may be configured to process multiple requests in parallel by using multiple processing threads, as discussed in more detail below.

At (4), the message processor 132 evaluates the request to identify a key associated with the requested data object. In some embodiments, the request may comprise a key field that the message processor may inspect. Alternatively or additionally, the message processor may inspect specific fields or bytes of a request according to a configuration set by an administrator during setup of the storage interface server 101. For example, the storage interface server may receive requests containing URLs, and may be configured to inspect a portion of a URL's query field to identify a key associated with the request.

At (5), the message processor 132 uses the key to query configuration map 136. In some embodiments, the configuration map may be a map structure stored in local memory. For example, the message processor may query the configuration map by performing a lookup on a hash table. Additionally or alternatively, the configuration map may be provided by another service or non-local storage. In these embodiments, the message processor may be configured to query the non-local configuration map only if the key (or data derived therefrom) is not found in a local copy.

The message processor 132 may use a function to derive key data that is mapped to a storage configuration in the configuration map 136. In some embodiments, a subset of characters or bytes of the key may be mapped to a particular storage configuration for the storage node on which the requested data object identified by the key may be stored. For example, the first n characters or bytes of a key of length m (where n<m) may be used to map the key to a particular storage configuration. These n bytes may be referred to as the "key prefix." As another example, the last n characters or bytes of a key of length in (where n<m) may be used to map the key to a particular storage configuration. These n bytes may be referred to as the "key suffix." As a further example, the n characters or bytes beginning and/or ending at a predetermined location within a key of length in (where n<m) may be used to map the key to a particular storage configuration. These n bytes may be referred to as the "key infix." In some embodiments, key data may be computed from a key. For example, a hashing algorithm may be used to derive fixed-length key data from a data object key in a request. The example methods of deriving key data from a data object key described herein are illustrative only, and are not intended to be limiting, required, or exhaustive.

In some embodiments, the key that is used outside of the data storage VPC 126 is the same key that used by the storage node 110 within the data storage VPC 126 to store the data object. For example, the prefix/suffix/infix bytes that are mapped to the storage configuration may remain a part of the key used by the storage node to identify the data object. In other embodiments, when the data object is referenced by key outside of the data storage VPC, the key used for storage purposes is "decorated" or otherwise augmented with key data that is mapped to a particular storage configuration. For example, a data object may be stored in a particular storage node 110 using a key of length i. Any time the data object is referenced outside the data storage VPC (e.g., included in a web page), the key that is used is decorated with a prefix/suffix/infix set of bytes of length j that the message processor 132 may later use to determine the proper storage configuration for accessing the data object. Thus, the key that is used outside the data storage VPC (and used to request the data object from the storage interface server 101) may have a length of i+j.

At (6) the message processor receives a storage configuration from the configuration map corresponding to the queried key data. In some embodiments, the storage configuration may comprise a plurality of destination storage nodes, protocol information associated with the storage nodes (e.g., information regarding the particular data access protocol used by the destination storage node), and/or processing instructions as described in more detail below.

At (7), the message processor 132 generates a translated storage request based on the data access request using the storage configuration retrieved form the configuration map. In some embodiments, the translated request may comprise a destination node and conform to a data access protocol based on a destination node and an associated protocol indicated by the storage configuration. Additionally or alternatively, the storage configuration may contain a plurality of possible destination nodes. In these embodiments, the message processor may select a destination node from the plurality of possible destination nodes according to a number of criteria, such as relative utilization, connection latency, etc. For example, a request may be received for which the corresponding storage configuration lists a set of data storage servers, and the message processor 132 may be configured to preferentially select a node with which it already has an active connection, in order to reduce the time required to process a request.

At (8), the message processor 132 forwards the translated request to storage connection handler 134. In some embodiments, forwarding the request may comprise enqueuing the request on a request queue associated with the storage connection handler. In these embodiments, the storage connection handler may process requests sequentially in the order they are received. Alternatively or additionally, the storage connection handler 134 may be configured to process multiple requests in parallel by using multiple processing threads, as discussed in more detail below. In some embodiments, the message processor 132 may forward the request with additional information, such as the key associated with the data access request.

At (9), the storage connection handler 134 transmits the storage request to storage node 110. In some embodiments, the storage connection handler 134 may maintain a continuous connection to the storage node 110. In these embodiments, the request may be immediately transmitted. Additionally or alternatively, the storage connection handler 134 may maintain transient connections to the storage node 110. In these embodiments, the storage connection handler 134 may first need to establish a connection to storage node 110 before transmitting the storage request. Additionally, the storage connection handler 1343 may inspect the request to identify authentication information associated with the request, and use the authentication information to establish an authenticated connection with the storage node 110. For example, a storage interface server 101 may receive a request to access a data object associated with a user account that includes access credentials associated with that account, and the storage interface server 101 may subsequently establish a connection to a destination storage node 110 using the access credentials contained in the request before querying for the requested data object.

At (10), the storage connection handler 134 receives a storage response from storage node 110, and forwards it to message processor 132 at (11). In some embodiments, forwarding the response may comprise enqueuing the response on a response queue associated with the message processor 132. In these embodiments, the message processor may process responses sequentially in the order they are received. Alternatively or additionally, the message processor 132 may be configured to process multiple responses in parallel by using multiple processing threads, as discussed in more detail below. In some embodiments, the storage connection handler 134 may be further configured to forward the response with an identifier associated with the request corresponding to the response. For example, the storage connection handler 134 may forward the response and a key associated with the data access request.

At (12), the message processor 132 generates a translated response using the storage configuration corresponding to the key identified from the initial data access request. In some embodiments, the message processor 132 may perform additional processing on the response data, based on the configuration, before constructing the translated response. For example, a storage configuration corresponding to a key associated with a request may include instructions or executable code that the message processor 132 may execute to further process the response received from the storage node. In some embodiments, the message processor 132 may be configured to construct the data access response to conform to a protocol associated with the data access request. For example, a storage interface server 101 may be configured to receive data access requests in Redis format, and the message processor 132 will in this case format the data access response to conform to the Redis protocol.

At (13), the message processor 132 forwards the data access response to the client connection handler 130. In some embodiments, forwarding the response may comprise enqueuing the response on a response queue associated with the client connection handler 130. In these embodiments, the client connection handler 130 may process responses sequentially in the order they are received. Alternatively or additionally, the message processor 132 may be configured to process multiple responses in parallel by using multiple processing threads, as discussed in more detail below.

At (14), the client connection handler 130 transmits the response to the data accessor server 120 that sent the request at (1). In some embodiments, the client connection handler 130 may terminate the connection after completing the transaction. Additionally or alternatively, the client connection handler 130 may maintain the connection until it is terminated by the data accessor server 120 and/or a timeout occurs.

Example Multi-Response Interaction

Figure 3:
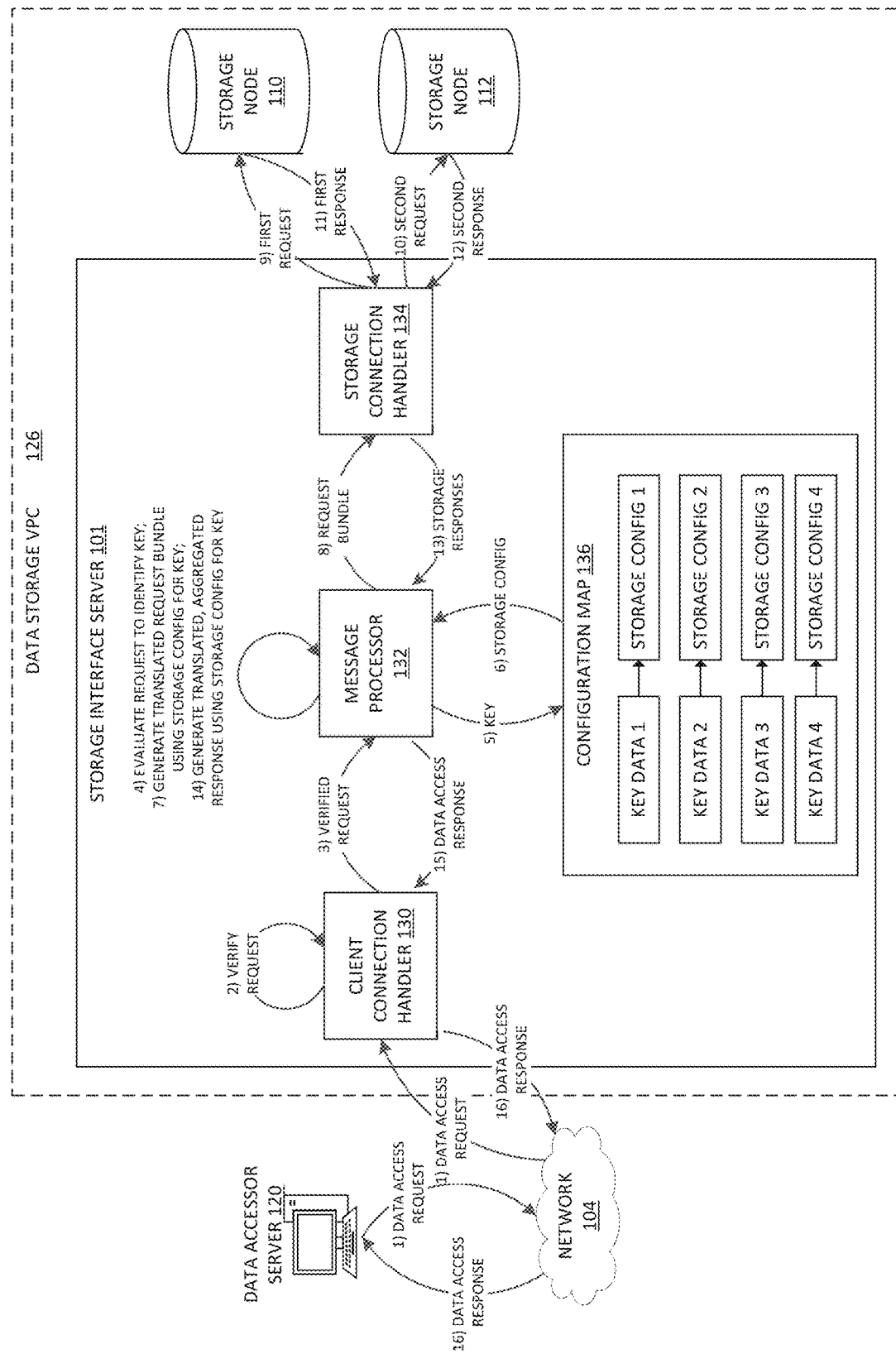
FIG. 3 is a block diagram of illustrative data flows and interactions between components of an example storage interface server connected to multiple storage nodes and an external data accessor server according to some embodiments.

FIG. 3 depicts illustrative interactions for servicing of a data access request that generates multiple downstream requests and responses. As in FIG. 2 above, the interaction begins with a data accessor server 120 transmitting a data access request to storage interface server 101 at (1). At (2), the client connection handler 130 verifies the request, forwards the request to message processor 132 at (3), and at (4) the message processor identifies a key associated with the request, performs a lookup with the key at (5), and retrieves a storage configuration at (6).

At (7), the message processor 132 generates, based on the data access request, a storage request bundle using the storage configuration. In some embodiments, a storage configuration may indicate a plurality of destination nodes for a single request. In these embodiments, the message processor 132 may generate a plurality of storage requests corresponding to the plurality of destination nodes. For example, a data accessor 120 may send the storage interface server 101 a data access request to retrieve an object and associated metadata; the storage configuration corresponding to an associated request key may indicate that the object requested is stored on a first node 110 and the metadata is stored on a second node 112. In this example, the storage interface server 101 may generate a request for the data object with its destination set to the first node 110, and a second request for the metadata with its destination set to the second node 112. In some embodiments, the plurality of destination nodes may be accessible by different protocols. In these embodiments, each request may be configured to conform to the protocol associated with its destination.

At (8), the message processor 132 forwards the request bundle to storage connection handler 134. In some embodiments, the request bundle may be a single object containing the data associated with each request. Alternatively or additionally, the requests may be forwarded separately. In some embodiments, forwarding the requests individually may comprise enqueuing the requests on a request queue associated with the storage connection handler 134. In these embodiments, the storage connection handler 134 may process requests sequentially in the order they are received. Alternatively or additionally, the storage connection handler 134 may process requests in parallel by using multiple processing threads, as discussed in more detail below.

At (9), the storage connection handler 134 transmits a first request to storage node 110, and at (10) the storage connection handler 134 transmits a second request to storage node 112. At (11), the storage connection handler 134 receives a first response from storage node 110, and at (12) the storage connection handler 134 receives a second response from storage node 112. In some embodiments, the storage connection handler 134 may process request-response pairs sequentially. For example, the storage connection handler 134 may be configured to send a first request, wait for a response, and then send a second request. In these embodiments, the storage connection handler 134 may be configured with a timeout to ensure that requests to one storage node are not postponed indefinitely due to errors in communication with another storage node. Alternatively or additionally, the storage connection handler 134 may transmit requests to multiple storage nodes concurrently.

At (13), storage connection handler 134 forwards the storage responses to message processor 132. In some embodiments, the storage connection handler 134 may forward the responses as they are received from the storage nodes. Additionally or alternatively, the storage connection handler 134 may wait until all responses are received before forwarding them to the message processor 132. In some embodiments, forwarding the responses may comprise enqueuing the response on a response queue associated with the message processor 132. In these embodiments, the message processor 132 may process requests sequentially in the order they are received. Alternatively or additionally, the message processor 132 may be configured to process multiple requests in parallel by using multiple processing threads, as discussed in more detail below.

At (14), the message processor 132 generates a translated data access response using the storage configuration corresponding to the key associated with the initial data access request. In some embodiments, the message processor 132 may perform additional processing on the response data, based on the storage configuration, before constructing the translated response.

For example, a storage configuration corresponding to a key associated with a request may include instructions or executable code that the message processor 132 may execute to further process the response received from the storage node. In another example, the storage configuration may indicate that the message processor 132 should aggregate the data received from multiple responses. In some embodiments, the message processor 132 may be configured to construct the data access response to conform to a protocol associated with the data access request. For example, a storage interface server 101 may be configured to receive data access requests in Redis format, and the message processor 132 will in this case format the data access response to conform to the Redis protocol.

At (15), the message processor 132 forwards the data access response to the client connection handler 130. In some embodiments, forwarding the response may comprise enqueuing the response on a response queue associated with the client connection handler 130. In these embodiments, the client connection handler 130 may process responses sequentially in the order they are received. Alternatively or additionally, the client connection handler 130 may be configured to process multiple responses in parallel by using multiple processing threads, as discussed in more detail below. At (16), the client connection handler 130 transmits the response to the data accessor server 120. In some embodiments, the response may comprise a single message. In other embodiments, the response may comprise a plurality of discrete messages. For example, a data accessor 120 may request a data object of a size that exceeds the packet limit for a TCP connection; the storage interface server 101 may transmit the object via a response that is broken up into a series of messages each containing a portion of the data object. In some embodiments, the client connection handler 130 may terminate the connection after completing the transaction. Additionally or alternatively, the client connection handler 130 may maintain the connection until it is terminated by the data accessor 120 and/or a timeout occurs.

Example Request-Response Interaction

Figure 4:
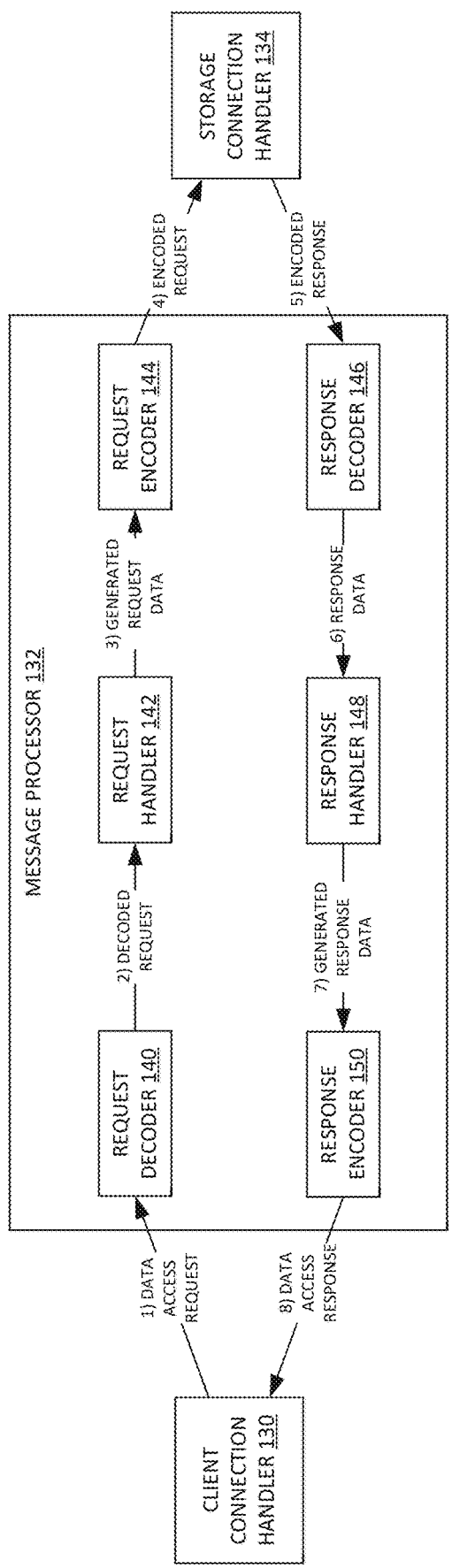
FIG. 4 is a block diagram of illustrative data flows and interactions between sub-components of a message processor component of an example storage interface server according to some embodiments.

FIG. 4 shows example data flows and interactions of components of an example message processor 132 of a storage interface server 101 during processing of a data access request. At (1), a request decoder 140 receives a data access request from a client connection handler 130. The request decoder 140 may decode a received request according to a standard protocol, such as Redis, Jedis, XML, HTTP, JSON, etc. The request decoder 140 may construct a request object representing the request data and forward the request object, at (2), to a request handler 142. For example, the request decoder 140 may analyze a request at the byte level and parse data regarding the request to be handled.

The request handler 142 receives decoded request objects from the request decoder 140 and performs the steps of processing the request as described in more detail above. To process the request, the request handler 142 may first identify a key associated with the request data. The key may be a key field of the request, or it may comprise a plurality of fields configured by an administrator during setup of the storage interface server. For example, an incoming request may comprise a URL with a query portion denoting a service name and an identifier of a data object to retrieve from the named service; the storage interface server 101 may be configured to extract the service name and the data object identifier and concatenate these fields to construct the key.

With the identified key, the request handler may retrieve a storage configuration associated with the key from a configuration map 136 as described above. The retrieved storage configuration may identify a plurality of destination nodes. The request handler may determine a destination node from the plurality of destination nodes. In some embodiments, load-balancing or other criteria may be used to determine a destination node. As described above, the request handler 142 may further process the request data according to the storage configuration. For example, the storage configuration may contain authentication information related to the destination node, and the request handler 142 may annotate the request data to include the authentication information. Alternatively or additionally, the storage configuration may include instructions or code that can be executed by the request handler 142. For example, the request handler 142 may receive request data containing string fields with a corresponding storage configuration indicating that the fields should be "sanitized" for insertion into a database query, and the request handler 142 may subsequently remove or escape characters in the string according to a sanitization logic.

At (3), the request handler 142 may forward the generated request data to the request encoder 144. The request encoder 144 may serialize or otherwise encode the request data into a format transmissible over a network connection. In some embodiments, the storage configuration may further comprise a protocol associated with the determined storage node. In these embodiments, the request encoder 144 may generate a serialized request structured according to a protocol associated with a destination node, and populate the generated request with the data received from the request decoder 140.

At (4), the request encoder 144 forwards the generated request to the storage connection handler 134. In some embodiments, the encoded request may be forwarded with authentication information included from the corresponding storage configuration. In other embodiments, the storage connection handler 134 may receive authentication information for the destination node from other sources, such as an authentication service, a cached credential store, etc., or it may not require authentication information to connect to the request's destination node.

At (5), the response decoder 146 receives an encoded storage response from the storage connection handler 134. In some embodiments the response decoder 146 may decode a received response according to a standard protocol. Alternatively or additionally, the response decoder 134 may decode the response based on a protocol associated with a storage configuration corresponding to the initial request that prompted the response. The response decoder 146 may construct a response object representing the response data and forward the response object, at (6), to a response handler 148.

The response handler 148 may perform further processing on response data. In some embodiments, the response handler 148 may inspect the response data and determine that it is incomplete. In these embodiments, the response handler 148 may cache the data and await further response data before continuing processing. Alternatively, the response handler 148 may process response data as it is received. In some embodiments, the response handler 148 may be configured to perform further processing based on instructions or code contained in the storage configuration corresponding to the response. For example, the response handler 148 may concatenate a series of response messages into a single response object. For a further example, the response handler 148 may process the data by performing calculations or set operations on the data, such as converting field types, creating an intersection of fields, compressing data objects, obfuscating data, filtering data, etc., as described in greater detail below.

At (7), the response handler 148 forwards a generated response to response encoder 150. In some embodiments, the response handler 148 may forward a plurality of responses corresponding to a single request. In these embodiments, the response encoder 150 may encode the responses separately, or it may encode a single data access response based on the plurality of responses. In some embodiments, the response encoder 150 may encode the responses in accordance with a standard format, such as Jedis, Redis, etc. corresponding to a format of the initial request. At (8) the response encoder 150 forwards an encoded data access response to the client connection handler 130 for transmission to the data accessor 120.

Example Multi-Threading Message Processor

Figure 5:
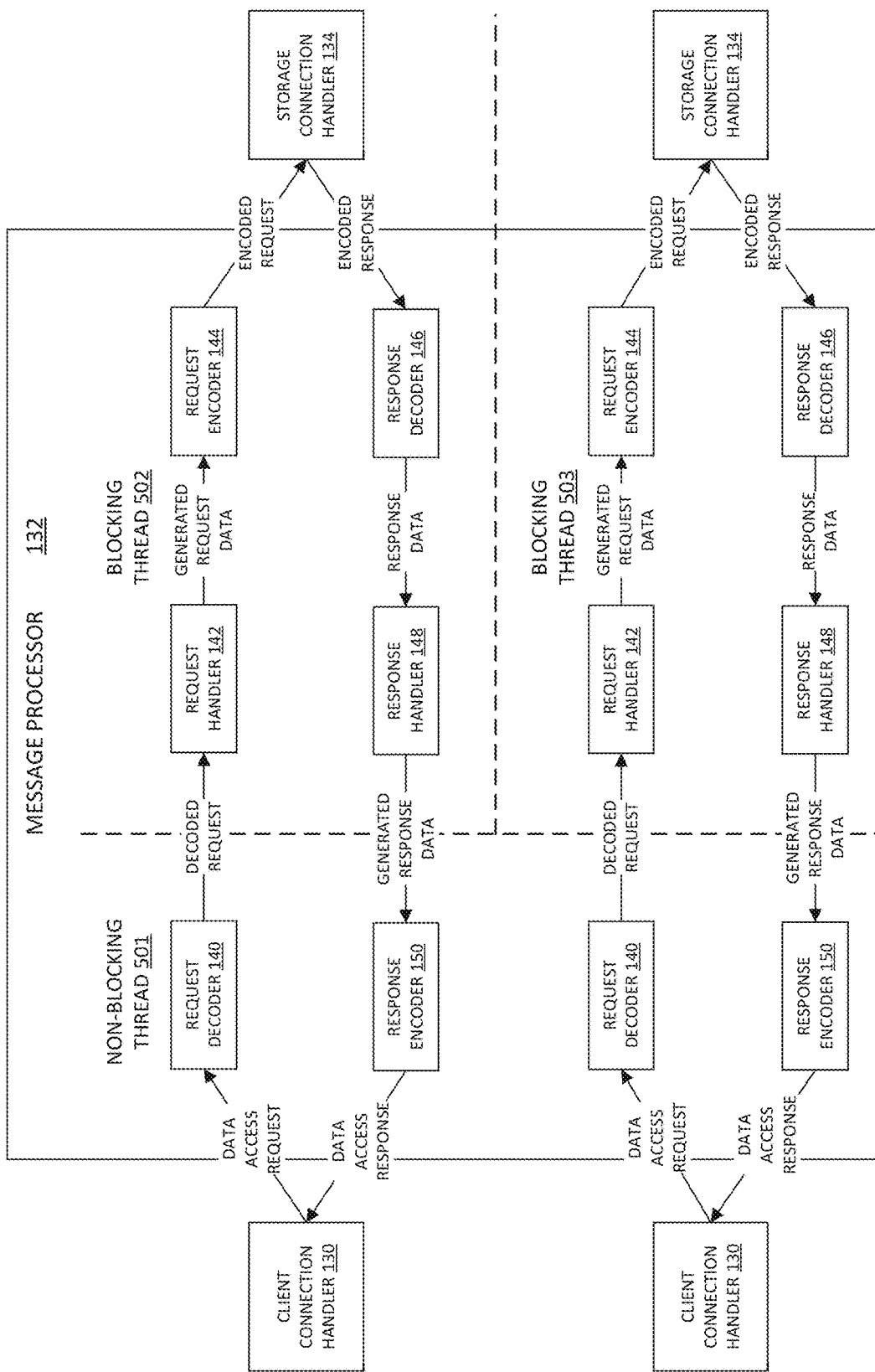
FIG. 5 is a block diagram of illustrative data flows and interactions between sub-components of a message processor component of an example storage interface server operating in a multi-threaded computing environment according to some embodiments.

FIG. 5 shows example data flows and interactions of components of an example message processor 132 operating within a multi-threaded computing environment. Multi-threading allows a computer to execute multiple instances of a unit of logic, and/or multiple different units of logic, concurrently. In an example embodiment, non-blocking thread 501 and blocking threads 502 and 503 may all operate concurrently. In some embodiments, non-blocking thread 501 may include a request decoder 140 and a response encoder 150, and each of blocking threads 502 and 503 may include a request encoder 144 and a response decoder 146, as well as a request handler 142 and a response handler 148. Illustratively, this enables the message processor 132 to concurrently engage in decoding of a data access request or encoding of a data access response with thread 501 while simultaneously encoding a storage request, decoding a storage response, or handling a request or response with each of threads 502 and 503. Thus, for example, the message processor can receive a request from a client connection handler 140 and a response from a storage connection handler 134 and decode the request and response simultaneously.

Threads 502 and 503 are illustratively shown as blocking threads. In some embodiments, blocking threads may handle events that require blocking calls to external services. A blocking call is one that may suspend thread execution until the call finishes processing. For example, the request handler 142 may make a blocking call to send an encoded request to a destination storage node that suspends execution of the thread until a response is received from the destination storage node.

Thread 501 is illustratively shown as a non-blocking thread. A non-blocking thread is one in which no calls are made to code or logic that may wait on the operation of other components of the system. For example, the request decoder 140 may receive a request, decode it into a data object, and forward it to the request handler 142 without making any external calls that might suspend execution of the thread.

As shown in FIG. 5, the number of threads dedicated to blocking operations and non-blocking operations may vary. The computational overhead involved in thread management may increase as the number of threads increases. As discussed in more detail below, in some embodiments a message processor 132 may be configured to optimize the number of threads to minimize overhead by maximizing the utilization of each thread.

Example Request Processing Routine

Figure 6:
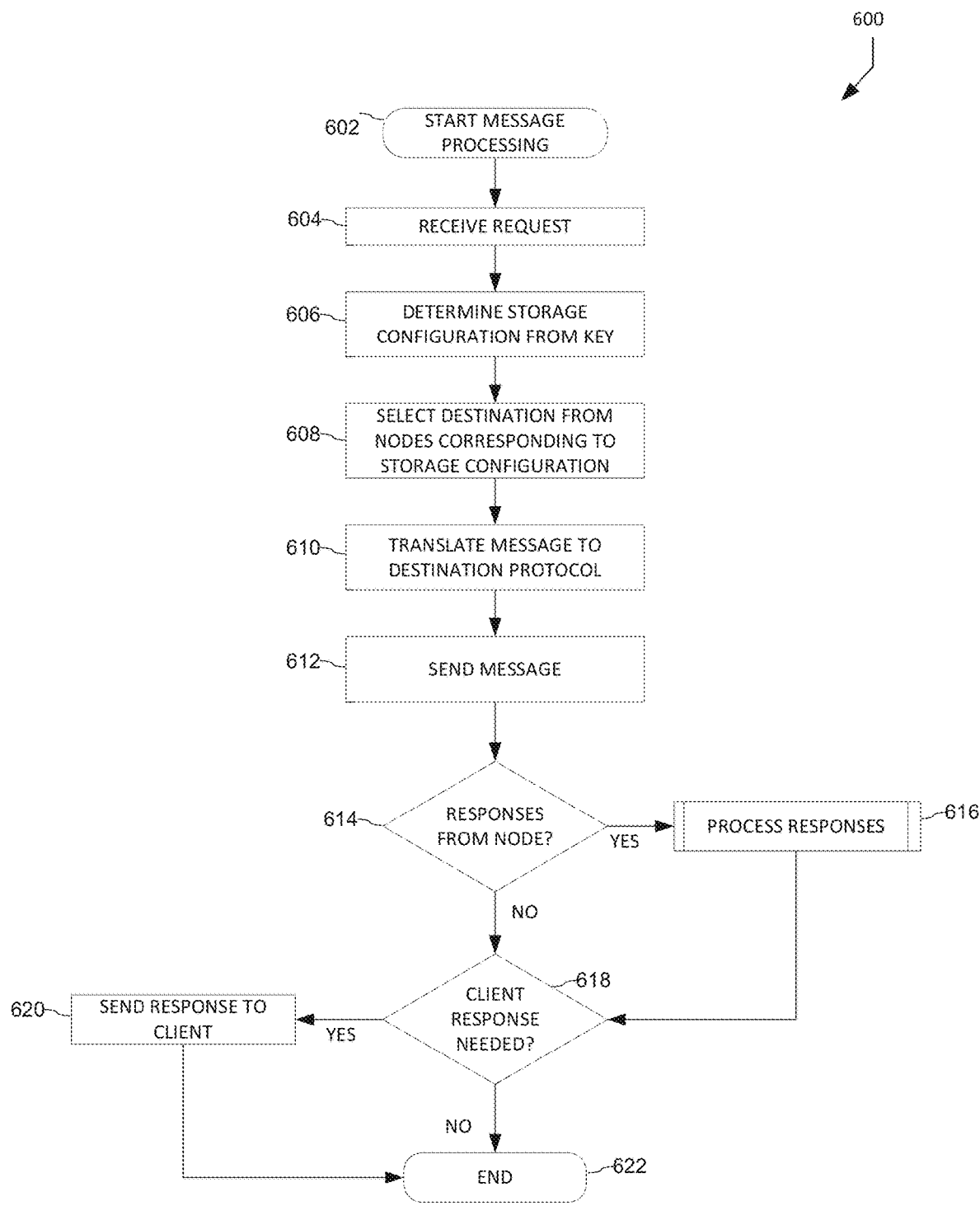
FIG. 6 is a flow diagram of an illustrative routine implemented on the storage interface server of FIG. 2 to process a data access request according to some embodiments.

FIG. 6 is a flowchart illustrating an overview of an illustrative message processing routine 600 executed on an example storage interface server 101. The routine 600 begins at block 602. In some embodiments, the routine 600 begins in response to an event, such as when the storage interface server 101 begins operation, establishes a connection with a data accessor 120, or the like.

At block 604, the storage interface server may 101 receive a data access request from a data accessor server 120.

At block 606, the storage interface server 101 may determine a storage configuration based on a key associated with the data access request. As discussed above, the key may be determined from a key field of the request, or it may be extracted from one or more portions of the request in accordance with a configuration of the storage interface server.

At block 608, the storage interface server 101 may select a destination node from a plurality of storage nodes that may be contained in the storage configuration determined in block 306. As discussed in more detail above, in some embodiments the selection of a destination node may be based on load-balancing or other criteria. In some embodiments, multiple destination nodes may be selected At block 610, the storage interface server 101 may generate a translated request conforming to a protocol associated with a selected destination node. For example, a data access request received in Redis format may be translated to a NoSQL query, a Memcached query, or any other protocol associated with a destination node. In some embodiments, translating a request may comprise generating multiple storage requests to a single node, and/or requests to multiple storage nodes.

At block 612, the storage interface server 101 may transmit the translated request to the destination node. In some embodiments, transmission of the translated request may comprise transmission of multiple request messages.

At decision block 614, the storage interface server 101 determines whether a response has been received from a destination node. If a response has been received, the routine may proceed to block 616. If no responses are received, the routine may proceed to block 618.

At block 616, the storage interface server 101 processes the responses. In some embodiments, processing responses may comprise concatenating multiple responses from one or more storage nodes. In some embodiments, processing of a response may further comprise computations or operations on the received response data. Examples of response processing are described in greater detail below.

At decision block 618, the storage interface server 101 determines whether a client response is needed. In some embodiments, the storage interface server 101 may receive data access requests to perform atomic operations that do not need a response. In these embodiments, a confirmation response may be generated, or a response to the data accessor 120 may be generated only to indicate that an error has occurred. In some embodiments, the storage interface server 101 may generate multiple responses to a single request. For example, a data accessor 120 may request a data object that exceeds the maximum packet size of the network connection, and the storage interface server 101 may divide the response into multiple messages containing portions of the requested object. If a response is needed, the routine 600 proceeds to block 620.

At block 620, the storage interface server 101 sends a response to the data accessor. In some embodiments, the storage interface server 101 may transmit a single message. In some embodiments, a single message may contain multiple responses. In some embodiments, the storage interface server 101 may transmit a single response over multiple messages and/or multiple responses divided among multiple messages. In some embodiments, the storage interface server 101 may terminate a connection with the data accessor 120 when the response has been transmitted. Alternatively, the storage interface server 101 may maintain the connection to the data accessor 120 until a timeout has been reached.

Request Monitoring

Figure 7:
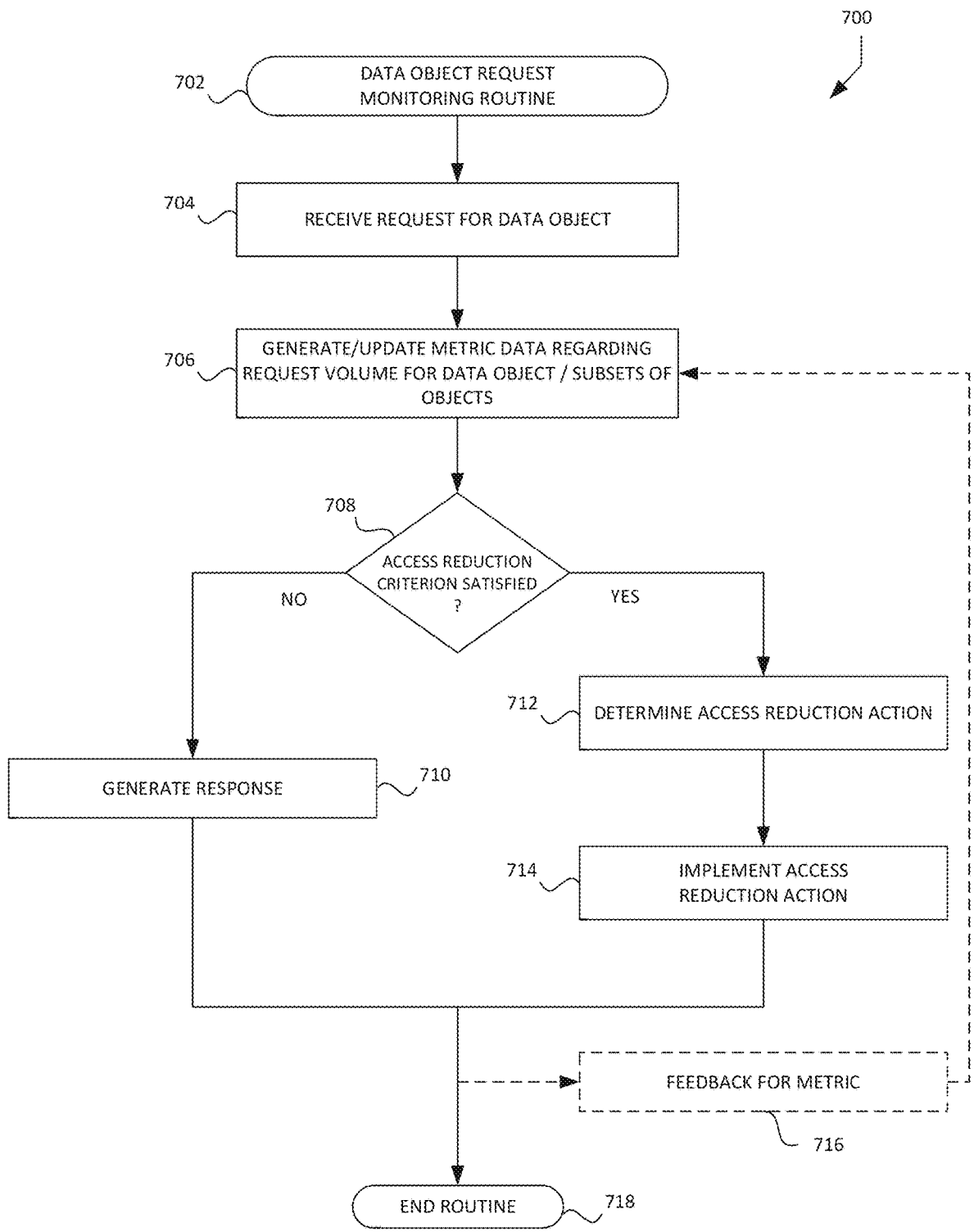
FIG. 7 is a flow diagram of an illustrative routine for monitoring requests and implementing access reduction actions according to some embodiments.

FIG. 7 is a flow diagram of an illustrative routine 700 that may be executed by a data storage interface, such as the storage interface server 101. The routine 700 may be used to monitor requests for data objects and implement access reduction actions as needed to prevent undesirable high-demand scenarios (e.g., denial of service attacks) that may affect the availability of the data storage interface or the backend data storage systems fronted by the data storage interface. For example, some data storage systems may not implement monitoring and access reduction functionality. As another example, some data storage systems may implement monitoring and access reduction functionality, but that functionality is not implemented across multiple distributed backed storage systems, including those that use different data access protocols. In these cases, the storage interface server 101 can provide this functionality for those data storage systems that do not provide it, and across all backend data storage systems collectively. Moreover, the storage interface server 101 can monitor and throttle or otherwise reduce access on a per-data-accessor basis, in some cases regardless of which backend data storage system store the data being accessed. For example, some data accessors may be monitored and throttled or otherwise have access restricted independently of other data accessors. In some embodiments, the routine 700 may be used to block or otherwise restrict access to particular data object or subsets thereof.

The routine 700 may begin at block 702. In some embodiments, the routine 700 begins in response to an event, such as when the storage interface server 101 begins operation, establishes a connection with a data accessor 120, or the like.

At block 704, the storage interface server 101 can receive a request for a data object. The request may be a request from a data accessor 120, as described in greater detail above. For example, the storage interface server 101 may receive a request for a particular data object, and that particular data object may be identified using an identifier, such as a key, that is included in the request.

At block 706, the storage interface server 101 can generate request metric data regarding requests for the data object and/or requests with which the requested data object is associated.

In some embodiments, the metric data may indicate a total quantity of requests that have been received for the requested data object within a predetermined or dynamically determined period of time. For example, the storage interface server 101 may use a clock to determine a time at which each request is received, and a sliding window of time within which requests are totaled. When the request is received, the storage interface server 101 may increment a running total or otherwise calculate the number of requests received for the data object within the sliding window. The size of the sliding window of time may be defined in terms of units of time, such as milliseconds, seconds, or the like. In some embodiments, the size of the sliding window of time may be dynamically determined and may therefore change. For example, at certain times of day or certain seasons of the year the size of the sliding window may be different than other times or day or seasons or the year.

In some embodiments, the metric data may indicate a total quantity of requests that have been received within a predetermined or dynamically determined period of time for a group of data objects with which the requested data object is associated. Illustratively, the data object may be associated with a group of objects based on a storage node or storage cluster on which the data object is stored. For example, the storage interface server 101 may use a clock to determine a time at which each request is received, and a sliding window of time within which requests are totaled. When the request is received, the storage interface server 101 may increment a running total or otherwise calculate the number of requests received within the sliding window for the group of data objects that includes the requested data object. As with the example above, the size of the sliding window of time may be defined in terms of units of time, and may or may not be dynamically determined.

In some embodiments, the metric data may be determined at a granular level based on one or more aspects of the request, data accessor 120, context, or combination thereof. For example, the total quantity of requests may be incremented or calculated for the current data accessor 120 making the current request, the current client VPC 122 with which the current data accessor 120 is associated, or the like. In this way, data accessor-specific trends can be monitored and access reduction actions implemented on a more fine-grained level than requested data objects or groups thereof.

In some embodiments, the metric data may not represent a quantity of requests, but may instead represent other metrics. For example, the metric data may represent a rate of requests (e.g., transactions per second), a response time of requests (e.g., milliseconds of elapsed time to respond to a request), a degree of network congestion for the network over which the storage interface server 101 communicates with a back end storage node or system (e.g., latency or volume of network traffic), a degree of network congestion for the network over which the storage interface server 101 communicates with the data accessor 120, or some other metric. In some embodiments, the metric data may be a score computed using one or more of these or other data points.

At decision block 708, the storage interface server 101 can determine whether an access reduction criterion is satisfied. If not, the routine 700 proceeds to block 710 where a response to the request can be generated as described in greater detail elsewhere herein. Otherwise, if the access reduction criterion is satisfied, the routine 700 can proceed to block 712.

In some embodiments, the access reduction criterion may relate to a threshold against which the metric data may be analyzed. The storage interface server 101 may determine whether the metric data meets or exceeds a threshold value. For example, the threshold may represent a maximum value of the metric data, and any metric data beyond the threshold may satisfy the access reduction criterion (e.g., an access reduction action may be triggered in an effort to reduce the metric value). When a requested data object is represented by a particular key and requests associated with the key exceed the threshold, the key may be referred to as a "hot key." The threshold may be predetermined or dynamically determined. For example, at certain times of day or certain seasons of the year the threshold may be different than at other times or day or seasons or the year.

In some embodiments, the access reduction criterion may be determined and applied on a granular level, such as on a "per data accessor," "per VPC", "per data object," or "per storage node" basis. For example, the storage interface server 101 can monitor requests separately for different data accessors (e.g., maintain different metrics), and use different thresholds for different data accessors. Thus, some data accessors may have larger thresholds than other data accessors, and therefore some data accessors may be permitted a larger volume of requests before access reduction actions are implemented. A similar process may be used for different VPCs from which data access requests are received, different data objects being requested, different storage nodes from which data objects are retrieved, or any combination thereof.

In some embodiments, the access reduction criterion may relate to whether an access reduction action is in effect. As described in greater detail below, the storage interface server 101 may perform an access reduction action, such as throttling the requests that may be processed for the requested data object, blocking requests for the data object, or the like. The access reduction action may remain in effect until a subsequent determination is made, such as that the metric data no longer exceeds a threshold, or that a predetermined or dynamically determined period of time has passed. If the access reduction action remains in effect, then the access reduction criterion for the current iteration of the routine 700 may be satisfied. In such cases, the access reduction criterion may change from iteration to iteration of the routine 700. For example, a first access reduction criterion may be associated with a threshold value for a metric, while a second access reduction criterion may be in effect after satisfaction of the first access reduction criterion, and may be associated with a status of an access reduction action.

At block 712, the storage interface server 101 can determine an access reduction action to perform. The access reduction action may be determined based on the satisfaction of the access reduction criterion, as described above.

In some embodiments, if the access reduction criterion relates to a threshold value under which the metric data must remain, then the storage interface server 101 may determine to implement an access reduction action when the metric data exceeds the threshold. For example, the storage interface server 101 may be configured to implement throttling of the requests that may be handled for the requested data object or group of data objects. Throttling may be implemented by limiting the number of requests for the requested data object or group of data objects that may be processed within a period of time (e.g., limiting the transactions per second associated with the requested data object, using a token bucket algorithm, etc.). As another example, the storage interface server 101 can block all requests for the requested data object or group of requested data objects.

In some embodiments, the storage interface server 101 can block requests from particular data accessors. For example, the storage interface server 101 may block all requests from a specific data accessor based on the requests from the data accessor satisfying an access reduction criterion specific to that data accessor. As another example, the storage interface server 101 may block specific types of requests from a specific data accessor, such as write requests to change data previously stored by or accessed by another data accessor.

In some embodiments, if the access reduction criterion relates to a status of a previously-implemented access reduction action, then the storage interface server 101 may determine to continue the access reduction action. For example, the storage interface server 101 may determine to continue limiting the transactions per second associated with the requested data object, continue blocking processing of requests for the requested data object or groups of requested data objects, etc.

At block 714, the storage interface server can implement the determined access reduction action.

At block 716, feedback may be obtained in some embodiments, and the routine 700 may return to block 706. For example, information about the implemented access reduction action, the response that is generated, the data accessor, or the like may be obtained for use in subsequent metric generation/update operations.

At block 718, the routine 700 may terminate.

Data Object Modifications

Figure 8:
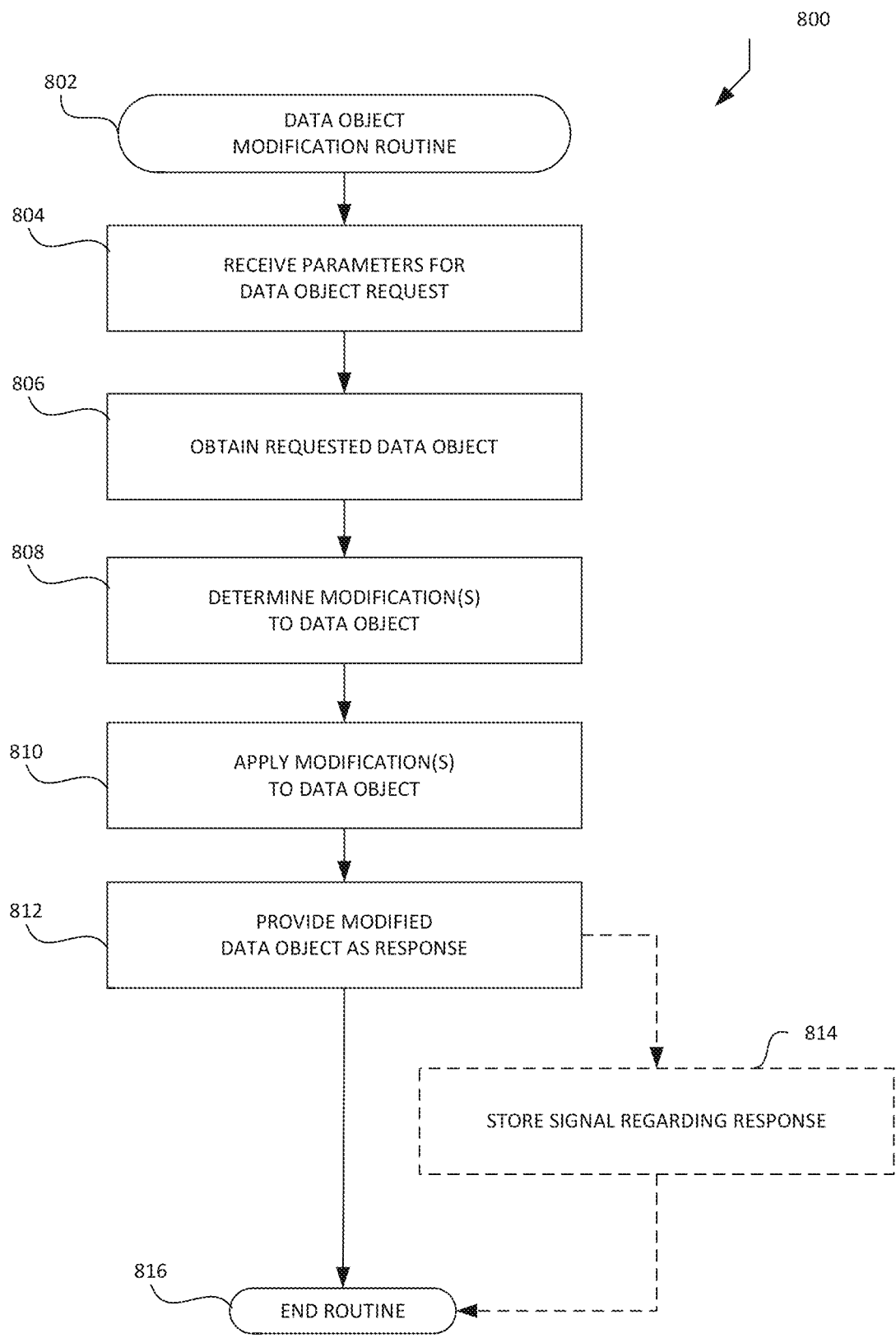
FIG. 8 is a flow diagram of an illustrative routine for transforming requested data objects according to some embodiments.

FIG. 8 is a flow diagram of an illustrative routine 800 that may be executed by a data storage interface, such as the storage interface server 101. The routine 800 may be used to dynamically modify requested data objects or portions thereof at run time ("on-the-fly") in response to a request for a data object. In some embodiments, the routine 800 may be used to generate a response that includes a composite of multiple data objects, portions thereof, or data derived therefrom, even if the request does not reference any or all of the multiple data objects. In some embodiments, the routine 800 may be used to generate a response that includes an obfuscated or otherwise transformed portion of a requested data object, even if the request does not reference a particular transformation to be applied. In some embodiments, the routine 800 may be used to generate a response that excludes a portion of the requested data object, even if the request does not reference any portion to be excluded.

Aspects of the routine 800 will be described with additional reference to FIGS. 9, 10, and 11, which are system diagrams of illustrative data flows and interactions between the storage interface server 101 and various storage nodes 110-112 during processing of requests.

The routine 800 may begin at block 802. In some embodiments, the routine 800 beings in response to an event, such as when the storage interface server 101 determines to obtain a requested data object, as described in greater detail above.

At block 804, the storage interface server 101 can receive parameters associated with a request for a data object. The parameters may be included in the request from a data accessor 120. For example, the parameters may be selected by, included with, or otherwise provided by the data accessor 120 in connection with a request for a data object. In some embodiments, some or all of the parameters may be obtained from other sources.

In some embodiments, the parameters may include reference data comprising a reference to a requested data object, context data regarding the request, other data, or some combination thereof. For example, the request may be a resource request, such as a GET request, for a particular data object. The reference to the requested data object may be data that can be used to access the requested data object, such as a file key or other identifier. The context data may include data regarding the context of the request, such as: an identifier of a user, account or other source of the request; an identifier of an access or security profile under which the request is being made; data representing the access or security rights under which the request is to be processed; an identifier of a location associated with the request; an identifier of a language associated with the request; data representing preferences or tendencies of a source of the request; a timestamp of the request; other context data; or some combination thereof.

At block 806, the storage interface server 101 may obtain the data object requested by the data accessor 120. For example, the storage interface server 101 may obtain the requested data object as described in greater detail above.

At block 808, the storage interface server 101 may determine one or more modifications to the requested data object.

Figure 9:
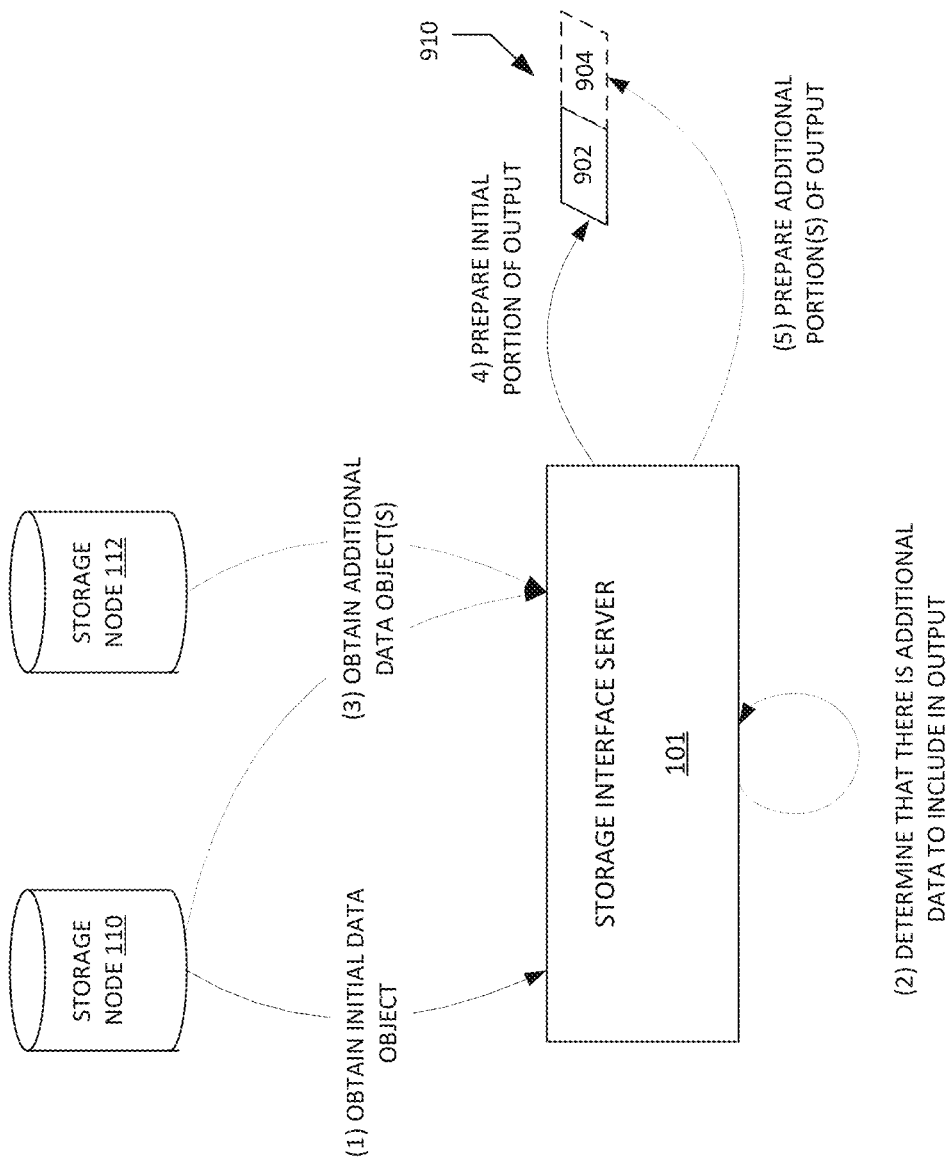
FIG. 9 is a block diagram of illustrative data flows and interactions between a storage interface server and various storage nodes to combine multiple data objects or portions thereof according to some embodiments.

FIG. 9 illustrates an example in which the modification is the addition of at least a portion of a second data object to the requested data object. As shown, the storage interface server 101 may obtain an initial data object (e.g., the requested data object) at [1]. The storage interface server 101 can determine at [2] that there are one or more additional objects to be included with the requested data object. In some embodiments, the determination may be based on context data and/or the requested data object. For example, data objects in a particular collection may be required to be concatenated with or otherwise combined with one or more additional data objects when requested. If the requested data object is in the particular collection, then one or more additional data objects may be combined with the requested data object to produce output. As another example, configuration data such as a record stored in a storage node 110 or some other data store may identify the additional data object(s) to be combined with the requested data object. The storage interface server 101 may access the record during the routine 800 to determine whether to perform a combination and which additional data object(s) to combine with the requested data object. In this way, the identity of the additional data object(s) can easily be changed without requiring programming changes to the code executed by the storage interface server 101. As a further example, the storage interface server 101 may test one or more items of context data against one or more criteria to determine whether to perform a combination and which additional data object(s) to combine with the requested data object. If an item of context data satisfies one or more criteria (e.g., a source or language of the request has a particular identity, a location associated with the request is in a particular region, etc.), then the storage interface server 101 can determine that the requested data object is to be combined with one or more additional data objects, and also determine the identity of the additional object(s).

Figure 10:
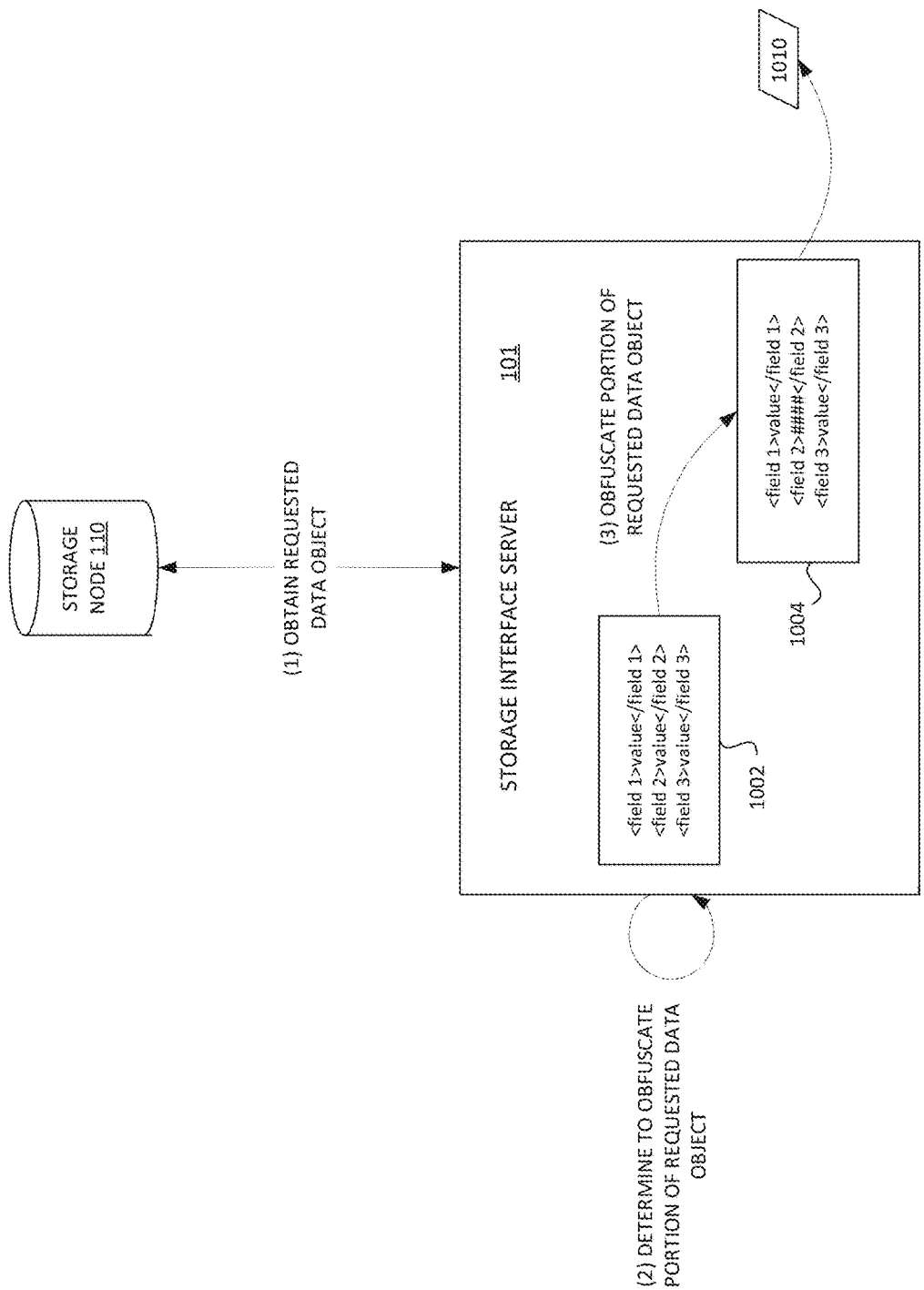
FIG. 10 is a block diagram of illustrative data flows and interactions between a storage interface server and a storage node to transform a data object or portions thereof according to some embodiments.

FIG. 10 illustrates and example of dynamically masking, scrambling, obscuring, or otherwise rendering unintelligible (collectively referred to herein as "obfuscating" for convenience) portions of a requested data object at run time in response to a request for the data object. As shown, the storage interface server 101 may obtain a requested data object at [1]. The storage interface server 101 can determine at [2] that one or more portions of the requested data object are to be obfuscated. In some embodiments, the determination may be based on context data and/or the requested data object. The storage interface server 101 may test one or more items of context data against one or more criteria to determine whether to perform an obfuscation and which portion(s) of the requested data object to obfuscate. If an item of context data satisfies one or more criteria, then the storage interface server 101 can determine that one or more portions of the requested data object are to be obfuscated such that a recipient of the response to the request is unable to understand the obfuscated portion(s). A different request for the same data object, but associated with different context data or other properties, may lead to a different result when testing the criteria and determining whether to obfuscate portions of the data object. In some embodiments, different portions of a requested data object may be associated with different criteria for un-obfuscated access. In such cases, the storage interface server 101 may test the criteria for each of the associated portions.

Testing the context data against the criteria may include: determining that a source of the request is prohibited from accessing the portion in un-obfuscated form, determining that a location associated with the request is prohibited from accessing the portion in un-obfuscated form, or determining than an access right or security profile associated with the request is prohibited from accessing the portion in un-obfuscated form. In some embodiments, the testing of context data against the criteria may be performed to determine that a portion of the requested data object is permitted to accessed in un-obfuscated form, rather than determining that the portion is prohibited from being accessed in un-obfuscated form. For example, testing the context data against the criteria may include: determining that a source of the request is permitted to access the portion in un-obfuscated form, determining that a location associated with the request is permitted to access the portion in un-obfuscated form, or determining than an access right or security profile associated with the request is permitted to access the portion in un-obfuscated form.

Figure 11:
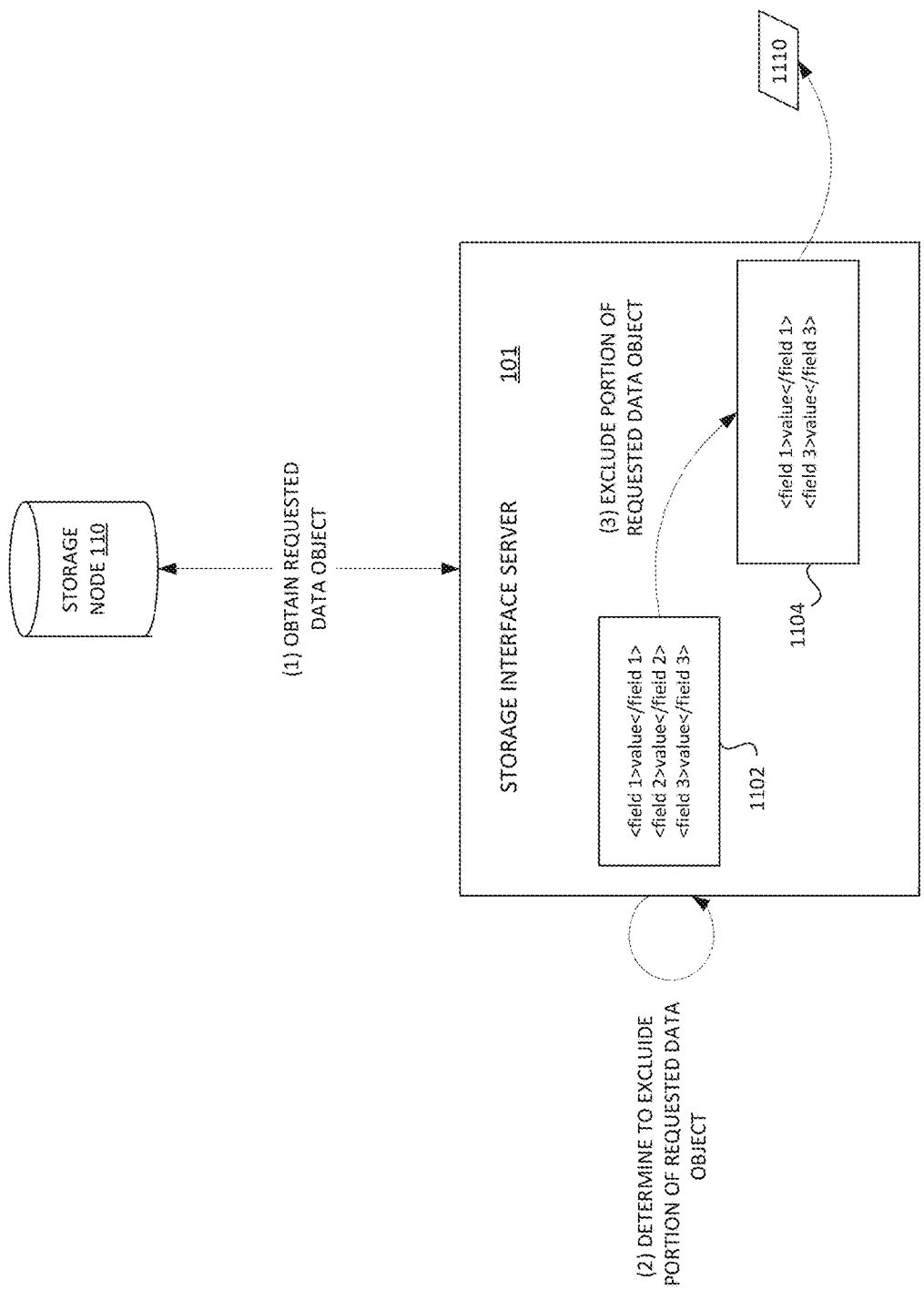
FIG. 11 is a block diagram of illustrative data flows and interactions between a storage interface server and a storage node to exclude portions of a data object according to some embodiments.

FIG. 11 illustrates an example of dynamically determining at run time a filtered subset of a requested data object to provide in response to a request for the data object. As shown, the storage interface server 101 may obtain a requested data object at [1]. The storage interface server 101 can determine at [2] that one or more portions of the requested data object are to be excluded from the output and thus not provided to a requesting device in response to the request. In some embodiments, the determination may be based on context data and/or the requested data object. For example, the storage interface server 101 may test one or more items of context data against one or more criteria to determine whether to exclude a portion or portions of the requested data object, and to determine which portion(s) of the requested data object to exclude. If an item of context data satisfies one or more criteria, then the storage interface server 101 can determine that one or more portions of the requested data object are to be excluded from output. A different request for the same data object, but associated with different context data or other properties, may lead to a different result when testing the criteria and determining whether to exclude portions of the data object. In some embodiments, different portions of a requested data object may be associated with different criteria for exclusion. In such cases, the storage interface server 101 may test the criteria for each of the associated portions.

Testing the context data against the criteria may include: determining that a source of the request is prohibited from accessing the portion, determining that a location associated with the request is prohibited from accessing the portion, or determining than an access right or security profile associated with the request is prohibited from accessing the portion. In some embodiments, the testing of context data against the criteria may be performed to determine that a portion of the requested data object is permitted to accessed, rather than determining that the portion is prohibited from being accessed. For example, testing the context data against the criteria may include: determining that a source of the request is permitted to access the portion, determining that a location associated with the request is permitted to access the portion, or determining than an access right or security profile associated with the request is permitted to access the portion.

At block 810, the storage interface server 101 may apply the determined modification(s) to the requested data object.

FIG. 9 illustrates an example in which output 910 is generated by preparing an initial portion of the output 902 (e.g., the requested data object) and including any additional portions of output 904. There may be any number of additional portions of output 904 to be included (e.g., 1, 2, 3, or more). The additional portions may be, or be derived from, additional data objects obtained from the same storage node 110 as the initial (e.g., requested) data object or from any number other storage nodes, such as storage node 112. In some embodiments, the additional data objects may be obtained using a data access protocol that is the same as, or different form, the data access protocol used to obtain the initial data object. For example, initial data may be obtained from a first data caching using a first data access protocol, while additional data may be obtained from a different caching system or from a different type of data storage altogether (e.g., a persistent data storage system) using a second data access protocol.

The output 910 may be generated by appending or concatenating the additional data object(s) to the requested data object, or vice versa. In some embodiments, only portions of the additional data object(s) and/or requested data object are included in the output 910. For example, portions may be obfuscated and/or filtered as described in greater detail below.

In one specific, non-limiting embodiment, the initial data object may be data regarding a particular network domain, such as a web-based content provider. Cached information associated with that domain may have been requested for processing (e.g., to dynamically determine which advertisements or other content items are to be included content associated with the domain). Additional information may also be obtained, such as information regarding a destination of the content so that content can be customized for the user. The storage information server 101 may determine, based on context information associated with the request for cached domain information, to include the additional destination-specific information in a response. Thus, the combination of data may be performed even in cases where the request for the requested data object references the requested data object and does not reference the additional data object(s).

FIG. 10 illustrates an example in which output 1010 is generated by selectively obfuscating or otherwise transforming one or more portions of a requested data object. As shown, the requested data object 1002 may include various data items or other portions, such as field 1, field 2, and field 3. The storage interface server 101 may determine that a subset of the data items, such as field 2, is to be obfuscated in the output. The storage interface server 101 may generate a modified data object 1004 in which the subset is obfuscated or otherwise transformed. The modified data object 1004 may be provided as output 1010 for responding to the data accessor server 120. In some embodiments, the determination of which subset of data times or other portions to transform may be based on parameters or context data associated with the request.

Obfuscating the content of a portion of the requested data object may involve the use of one or more obfuscation methods, such as scrambling the content in a pseudo random method, generating a hash of the content, replacing the content with a token, or the like. For example, when replacing a portion of the requested data object with a token, the storage interface server 101 may identify a token mapped to the content in a data store such as a key-value database, a relational database, an object storage service, or another network-accessible data store. In some embodiments, different obfuscation methods may be used for different portions of a data object, different data objects, different context data criteria, or the like. In some embodiments, the obfuscation method may be specified by an entity that owns or is responsible for the data object. For example, an entity may specify that particular type of obfuscation (e.g., an industry standard obfuscation method in the medical field) is to be used for a data object or bucket of data objects, while another entity may specify that a different type of obfuscation (e.g., tokenization using a mapping of tokens to data) is to be used for a different data object or bucket of data objects. If no obfuscation method is specified, the storage interface server 101 may apply a default obfuscation method.

In one specific, non-limiting embodiment, the transformations may include modifications to data, modifications to formatting, application of encryption, etc. For example, the storage interface server 101 may determine, for a resource request such as a GET request for a data object, to modify the data object by applying encryption to the data object or portions thereof, applying compression to the data object or portions thereof, changing a format of the data object or portions thereof, including a watermark the data object or portions thereof, or the like. The application of these transformations may be dynamically determined based on criteria associated with context data, criteria associated with the requested data object itself, etc. The storage interface server 101 may determine that properties of the request indicated by the context data or otherwise associated with the request satisfy or fail to satisfy particular criteria. For example, different levels of access rights for the source of the request may cause the storage interface server 101 to apply a watermark, change a format, provide an alternate data object, etc. As another example, different levels of encryption available to be decrypted by the source of the request (as indicated by context data) may cause the storage interface server 101 to dynamically select an encryption method based on the encryption that the source is configured to decrypt.

FIG. 11 illustrates an example in which output 1110 is generated by excluding a portion of a requested data object. As shown, the requested data object 1102 may include various data items or other portions, such as field 1, field 2, and field 3. The storage interface server 101 may determine that a subset of the data items, such as field 2, is to be excluded from the output. The storage interface server 101 may generate a modified data object 1104 in which the subset is filtered or otherwise excluded. The modified data object 1104 may be provided as output 1110 for responding to the data accessor server 120. In some embodiments, the determination of which subset of data times or other portions to exclude may be based on parameters or context data associated with the request.

In one specific, non-limiting embodiment, the requested data object may be a data file including collection of data records with one or more data fields. Some portions of the data file, such as subsets of records or data fields (e.g., those storing personally identifiable information or "PII") and the like may only be permitted to be accessed if the request satisfies one or more criteria. For example, portions may only be accessed if the request is associated with certain access rights. As another example, portions may only be accessed if a source of the request is associated with a particular location or region. As a further example, portions may only be accessed if the request is received from a particular source or subset of sources (e.g., portals, endpoints, etc.). The storage interface server 101 may determine that properties of the request indicated by the context data or otherwise associated with the request satisfy criteria for particular portions of the requested data object to be obfuscated or excluded from the response (or, alternatively, fail to satisfy the criteria for particular portions of the requested data object to be included in the response in non-obfuscated form). The storage interface server 101 may determine, based on this test with respect to one or more criteria, that the particular portions of the requested data object are to be obfuscated or excluded from output of the function. In some embodiments, different portions of a requested data object may be associated with different criteria access. In such cases, the storage interface server 101 may test the criteria for each of the associated portions.

At block 812, the storage interface server 101 may provide the modified data object as a response to the data accessor server 122.

At block 814, the storage interface server 101 may generate and/or store one or more notifications or other signals regarding the request and/or response. In some embodiments, the storage interface server 101 may provide signals indicating whether a request resulted in a cache hit, a cache miss, an access reduction action, or the like. These signals may be provided to other computing systems for analysis, or stored for subsequent access by other systems. For example, a notification may be sent to a computing device that is separate from the data accessor server 122, and may be in a different VPC than the data accessor server 122. To reduce the impact on request processing and response generation, such signals may be generated asynchronously (e.g., in a parallel process or subsequent to termination of process 800).

The routine 800 may terminate at block 816.

Although portions of the routine 800 are described as generating a response to a request for a data object, in some embodiments the output of the routine 800 or portions thereof may not be provided directly as the response to the request, but rather may be used by down-stream processes in preparing the response to the request. For example, the output may be further processed by another routine in a pipeline, such as in another instance of the routine 800, in a repeating or recursive manner. Accordingly, descriptions of generating a response may be interpreted as descriptions of generating intermediate output, and vice versa.

In some embodiments, the modified data object that is produced during routine 800 and provided as a response to the data accessor server 122 may be cached so that some steps do not need to be repeated each time the objects are to be used. Instead, the storage interface server 101 may determine whether the output has been cached and, if so, whether the cached output has expired. If the cached output has not expired, the storage interface server 101 may obtain the cached output and provide it as the output, or derive current function output from the cached function output. The output may be cached locally within the storage interface server 101, or in a network-accessible data store (e.g., a high-speed dedicated cache server). In some embodiments, cached output may be tagged or otherwise associated with the context data that was used to determine which data objects to combine to produce the output, what portions to obfuscate or exclude, or otherwise which modifications to perform. In this way, the storage interface server 101 may analyze the associated context data to determine which cached output, if any, is appropriate for use in responding to a subsequent request based on the context data associated with the subsequent request.

Example Storage Interface Server

Figure 12:
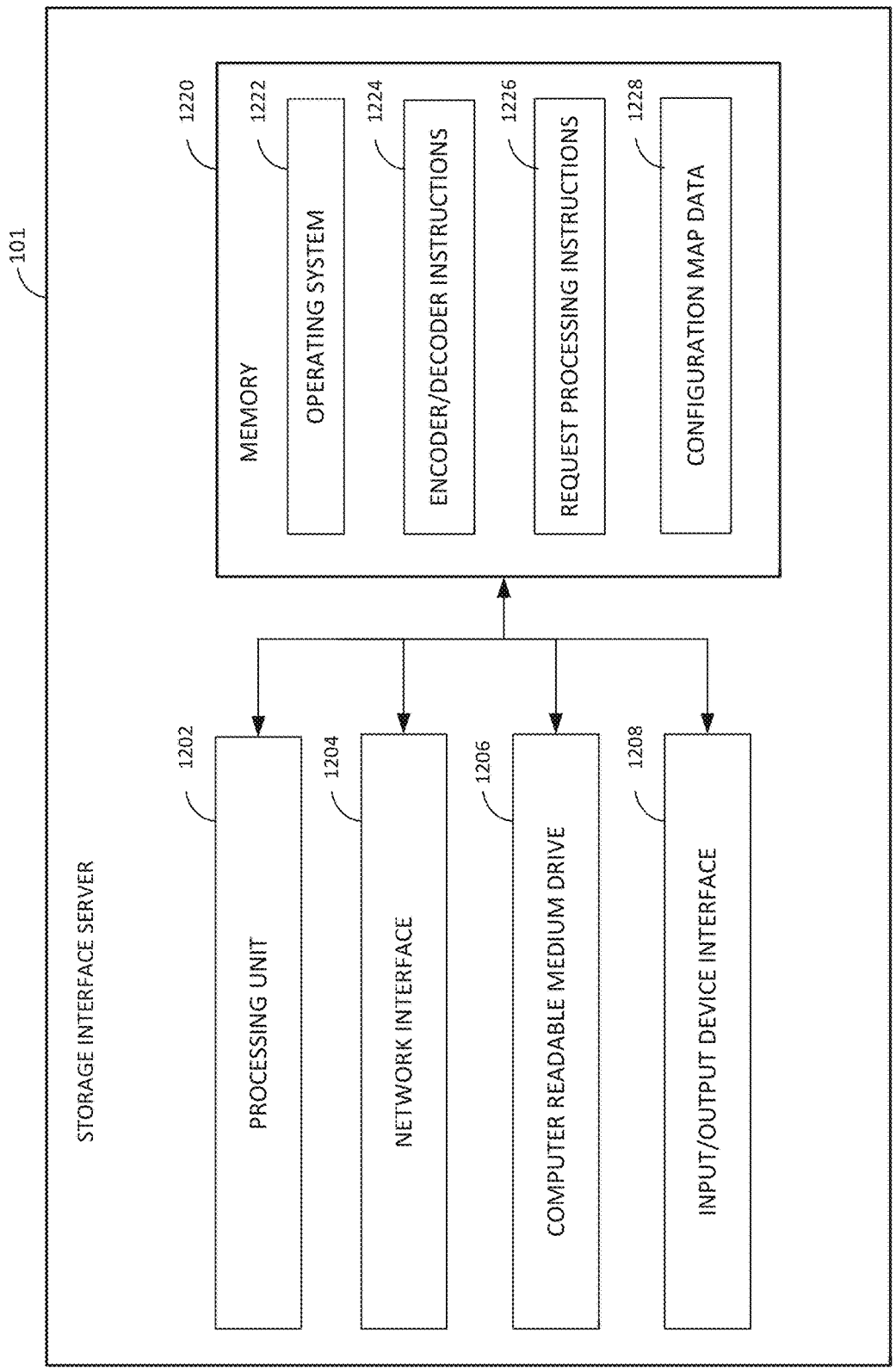
FIG. 12 is a block diagram of an illustrative computing device configured to implement features of a data storage interface server according to some embodiments.

FIG. 12 depicts a general architecture of a computing system (referenced as storage interface server 101) that operates to facilitate responding to data access requests in accordance with embodiments of the present disclosure. The general architecture of the storage interface server 101 depicted in FIG. 12 includes an arrangement of computer hardware and software modules that may be used to implement aspects of the present disclosure. The hardware modules may be implemented with physical electronic devices, as discussed in greater detail below. The storage interface server 101 may include many more (or fewer) elements than those shown in FIG. 12. Additionally, the general architecture illustrated in FIG. 12 may be used to implement one or more of the other components illustrated in FIG. 1. As illustrated, the storage interface server 101 includes a processing unit 1202, a network interface 1204, a computer readable medium drive 1206, and an input/output device interface 1208, all of which may communicate with one another by way of a communication bus. The network interface 1204 may provide connectivity to one or more networks or computing systems. The processing unit 1202 may thus receive information and instructions from other computing systems or services via the network 104. The processing unit 1202 may also communicate to and from memory 1220 and further provide output information for an optional display (not shown) via the input/output device interface 1208. The input/output device interface 1208 may also accept input from an optional input device (not shown).

The memory 1220 may contain computer program instructions (grouped as modules in some embodiments) that the processing unit 1202 executes in order to implement one or more aspects of the present disclosure. The memory 1202 generally includes random access memory (RAM), read only memory (ROM) and/or other persistent, auxiliary or non-transitory computer readable media. The memory 1220 may store an operating system 1222 that provides computer program instructions for use by the processing unit 1202 in the general administration and operation of the storage interface server 101. The memory 1220 may further include computer program instructions and other information for implementing aspects of the present disclosure. For example, in one embodiment, the memory 1220 includes a encoder/decoder instructions 1224 for implementing features of request encoding and/or decoding, such as those shown in FIGS. 4-6. As another example, the memory 1220 may include request processing instructions 1226 for implementing features of request process, such as those shown in FIGS. 7-11. As a further example, the memory 1220 may include configuration map data 1228 representing a configuration map 136. In addition, the memory 1220 may include and/or communicate with one or more data repositories (not shown), for example, to access user program codes and/or libraries.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A protocol-agnostic storage interface system comprising:
   a plurality of backend data storage nodes in a first virtual private cloud (VPC); and
   a storage interface server in the first VPC, wherein the storage interface server is configured to:
      receive, from a data accessor computing device in a second VPC, a first request for a data object, wherein the first request conforms to a first data access protocol, and wherein the first request comprises a key associated with the data object;
      determine a cache configuration based at least in part on the key, wherein the cache configuration identifies a subset of the plurality of backend data storage nodes with which the data object is associated, wherein a second data access protocol is associated with the subset of the plurality of backend data storage nodes;
      determine, based on the cache configuration, a first node of the plurality of backend data storage nodes;
      generate, based on the first request, a second request conforming to the second data access protocol, wherein the second data access protocol is different than the first data access protocol;
      transmit the second request to the first node;
      receive, from the first node, a first response message according to the second data access protocol;
      generate, based at least in part on the first response message, a second response message conforming to the first data access protocol; and
      transmit the second response message to the data accessor computing device.

2. The system of claim 1, wherein the storage interface server configured to transmit the second response message to the data accessor computing device is further configured to receive a third request from a second data accessor computing device using a first execution thread of a plurality of execution threads concurrently with transmitting the second response message to the data accessor computing device using the first execution thread.

3. The system of claim 1, wherein the storage interface server is further configured to:
   determine, based on the cache configuration, a second node of the plurality of backend data storage nodes;
   determine, based on the cache configuration, a third data access protocol associated with the second node, wherein the third data access protocol is different than the second data access protocol;
   generate, based on the first request, a third request conforming to the third data access protocol; and
   obtain a second data object from the second node based at least partly on the third request.

4. The system of claim 1, wherein the storage interface server is further configured to apply a transformation to the first response message, wherein the transformation comprises one of: obfuscation of a portion of the first response message, or exclusion of the portion of the first response message from the second response message.

5. A computer-implemented method comprising:
   under control of a storage interface server comprising one or more computing devices within a first virtual private cloud ("VPC"),
      receiving, from a data accessor computing device in a second VPC external to the first VPC, a first request for a data object, wherein the first request conforms to a first data access protocol;
      determining, based on at least a portion of the first request, a storage configuration associated with the data object;
      determining, based on the storage configuration, a storage node from which to request the data object, wherein the storage node is in the first VPC;
      determining, based on the storage configuration, a second data access protocol associated with the storage node;
      generating, based on the first request, a second request conforming to the second data access protocol;
      obtaining first response data from the storage node based at least in part on the second request;
      generating second response data based at least in part on the first response data and the first data access protocol; and
      transmitting the second response data to the data accessor computing device.

6. The computer-implemented method of claim 5, wherein determining the storage configuration comprises:
   determining key data based at least partly on the portion of the first request, wherein the portion of the first request comprises a data object identifier associated with the data object; and
   selecting, based on the key data, the storage configuration from a configuration map comprising pairs of key data and storage configurations.

7. The computer-implemented method of claim 6, wherein determining the key data comprises examining a subset of bytes of the data object identifier, wherein the bytes are located at one or more predetermined positions within the data object identifier.

8. The computer-implemented method of claim 6, wherein determining the key data comprises generating a hash using at least a subset of bytes of the data object identifier.

9. The computer-implemented method of claim 5, further comprising:
   determining, based on the storage configuration, a second storage node in the first VPC;
   determining, based on the storage configuration, a third data access protocol associated with the second storage node, wherein the third data access protocol is different than the second data access protocol;
   generating, based on the first request, a third request confirming to the third data access protocol; and
   obtaining a third response data from the second storage node based at least partly on the third request, wherein generating the second response data is based at least partly on the third response data.

10. The computer-implemented method of claim 5, further comprising:
   receiving, from a second data accessor computing device in a third VPC external to the first VPC, a third request for a data object, wherein the third request conforms to the first data access protocol;
   determining, based on at least a portion of the third request, a second storage configuration associated with the data object, wherein the second storage configuration is different than the storage configuration; and
   processing the third request based at least party on the second storage configuration.

11. The computer-implemented method of claim 5, further comprising receiving a third request from a second data accessor computing device using a first execution thread of a plurality of execution threads concurrently with transmitting the second response data to the data accessor computing device using the first execution thread.

12. The computer-implemented method of claim 5, further comprising applying a transformation to the first response data, wherein the transformation comprises one of: obfuscation of a portion of the first response data, or exclusion of the portion of the first response data from the second response data.

13. The computer-implemented method of claim 5, further comprising:
   generating a notification regarding at least one of the first request or the first response data; and
   sending the notification to a second computing device different than the data accessor computing device.

14. A system comprising:
   a plurality of backend data storage nodes in a first virtual private cloud (VPC); and
   a storage interface server in the first VPC, wherein the storage interface server is configured to:
      receive, from a data accessor computing device in a second VPC external to the first VPC, a first request for a data object, wherein the first request conforms to a first data access protocol;
      determine, based on at least a portion of the first request, a storage configuration associated with the data object;
      determine, based on the storage configuration, a storage node from which to request the data object, wherein the storage node is in the first VPC;
      determine, based on the storage configuration, a second data access protocol associated with the storage node;
      generate, based on the first request, a second request conforming to the second data access protocol;
      obtain first response data from the storage node based at least in part on the second request;

generate second response data based at least in part on the first response data and the first data access protocol; and transmit the second response data to the data accessor computing device.

15. The system of claim 14, wherein the storage interface server is further configured to:

determine key data based at least partly on the portion of the first request, wherein the portion of the first request comprises a data object identifier associated with the data object; and select, based on the key data, the storage configuration from a configuration map comprising pairs of key data and storage configurations.

16. The system of claim 15, wherein the storage interface server configured to determine the key data is further configured to examine a subset of bytes of the data object identifier, wherein the bytes are located at one or more predetermined positions within the data object identifier.

17. The system of claim 15, wherein the storage interface server configured to determine the key data is further configured to generate a hash using at least a subset of bytes of the data object identifier.

18. The system of claim 14, wherein the storage interface server is further configured to:

determine, based on the storage configuration, a second storage node in the first VPC;

determine, based on the storage configuration, a third data access protocol associated with the second storage node, wherein the third data access protocol is different than the second data access protocol;

generate, based on the first request, a third request conforming to the third data access protocol; and obtain a third response data from the second storage node based at least partly on the third request, wherein generating the second response data is based at least partly on the third response data.

19. The system of claim 14, wherein the storage interface server is further configured to:

receive, from a second data accessor computing device in a third VPC external to the first VPC, a third request for a data object, wherein the third request conforms to the first data access protocol;

determine, based on at least a portion of the third request, a second storage configuration associated with the data object, wherein the second storage configuration is different than the storage configuration; and process the third request based at least party on the second storage configuration.

20. The system of claim 14, wherein the storage interface server is further configured to apply a transformation to the first response data, wherein the transformation comprises one of: obfuscation of a portion of the first response data, or exclusion of the portion of the first response data from the second response data.

* * * * *